US009598507B2

(12) United States Patent
Motoda et al.

(10) Patent No.: US 9,598,507 B2
(45) Date of Patent: Mar. 21, 2017

(54) MODIFIED LIQUID DIENE-BASED RUBBER AND PRODUCTION PROCESS FOR THE SAME

(71) Applicant: KURARAY CO., LTD., Kurashiki-shi (JP)

(72) Inventors: Satoshi Motoda, Kamisu (JP); Kei Hirata, Kamisu (JP)

(73) Assignee: KURARAY CO., LTD., Kurahiki-shi (JP)

( * ) Notice: Subject to any disclaimer, the term of this patent is extended or adjusted under 35 U.S.C. 154(b) by 0 days.

(21) Appl. No.: 15/021,893

(22) PCT Filed: Nov. 27, 2014

(86) PCT No.: PCT/JP2014/081367
§ 371 (c)(1),
(2) Date: Mar. 14, 2016

(87) PCT Pub. No.: WO2015/083608
PCT Pub. Date: Jun. 11, 2015

(65) Prior Publication Data
US 2016/0229927 A1 Aug. 11, 2016

(30) Foreign Application Priority Data

Dec. 4, 2013 (JP) ................................. 2013-251127
Jul. 9, 2014 (JP) ................................. 2014-141212

(51) Int. Cl.
C08C 19/28 (2006.01)
C08C 19/34 (2006.01)
C08F 290/00 (2006.01)
C09J 4/06 (2006.01)
C08F 290/12 (2006.01)
C08F 299/00 (2006.01)
C09J 113/00 (2006.01)
C08F 8/14 (2006.01)
C08F 8/46 (2006.01)

(52) U.S. Cl.
CPC ............. C08C 19/28 (2013.01); C08C 19/34 (2013.01); C08F 290/00 (2013.01); C08F 290/12 (2013.01); C08F 290/128 (2013.01); C08F 299/00 (2013.01); C09J 4/06 (2013.01); C09J 113/00 (2013.01)

(58) Field of Classification Search
CPC .. C08F 8/14; C08F 8/46; C08F 290/00; C08F 290/128; C08C 19/28; C08C 19/34
See application file for complete search history.

(56) References Cited

U.S. PATENT DOCUMENTS 3,974,129 A * 8/1976 De La Mare ........... C08C 19/36
522/149
4,371,665 A 2/1983 Hino et al.
5,407,784 A 4/1995 Berrier et al.
5,523,383 A 6/1996 Ikeda et al.
2010/0761071 3/2010 Kitano et al.
2010/0152368 A1* 6/2010 Hirayama ............... C08L 21/00
524/570

FOREIGN PATENT DOCUMENTS

| CN | 101200527 A | 5/2008 |
|---|---|---|
| CN | 101289591 A | 10/2008 |
| EP | 0 246 918 A1 | 11/1987 |
| EP | 0 465 670 A1 | 1/1992 |
| EP | 0 465 672 A1 | 1/1992 |
| EP | 2 110 394 A1 | 10/2009 |
| JP | 54-096596 A | 7/1979 |
| JP | 54-129044 A | 10/1979 |
| JP | 54-160491 A | 12/1979 |
| JP | 55-84657 | 6/1980 |
| JP | 56-112921 A | 9/1981 |
| JP | 56-118433 | 9/1981 |
| JP | 56-118434 | 9/1981 |
| JP | 57-111313 A | 7/1982 |
| JP | 62-280204 A | 12/1987 |
| JP | 03-223315 A | 10/1991 |
| JP | 03-223316 A | 10/1991 |
| JP | 04-330446 A | 11/1992 |
| JP | 11-228928 | 8/1999 |
| JP | 2003-192750 A | 7/2003 |
| JP | 2009-029976 A | 2/2009 |
| JP | 2015-086283 A | 5/2015 |
| WO | 91/11473 A1 | 8/1991 |

OTHER PUBLICATIONS

International Search Report issued on Mar. 3, 2015 for PCT/JP2014/081367 filed on Nov. 27, 2014.
Decision to Grant a Patent issued Aug. 4, 2015, in Japanese Patent Application No. 2015-520027 (with English translation).
Extended European Search Report issued for corresponding application No. 14867981.4 on Jul. 1, 2016.
Chinese Office Action (No. 201480043115.7) dated Jul. 13, 2016.
Ma Jinhong, et al., "Synthesis of UV Curing Liquid Polyisoprene Rubber Modifier", vol. 36 No. 6, Journal of Jiangxi Normal University (Natural Sciences Edition) Nov. 2012, Article ID: 1000-5862 (2012) 06-0565-04.

* cited by examiner

Primary Examiner — Fred M Teskin
(74) Attorney, Agent, or Firm — Oblon, McClelland, Maier & Neustadt, L.L.P.

(57) ABSTRACT

A modified liquid diene-based rubber (A) including, in a molecule, a modified group (a) containing a (meth)acryloyl group as a part thereof and at least one modified group (b) selected from a dicarboxylic acid monoester and a dicarboxylic acid monoamide, with the proviso that the modified group (b) comprises no (meth)acryloyl group as a part thereof, wherein the functional group equivalent weights of the modified group (a) and the modified group (b) are each in the range of 700 to 40,000 g/eq. Also provided is a curable resin composition containing the modified liquid diene-based rubber.

11 Claims, No Drawings

MODIFIED LIQUID DIENE-BASED RUBBER AND PRODUCTION PROCESS FOR THE SAME

TECHNICAL FIELD

The present invention relates to a modified liquid diene-based rubber having an acryloyl group or a methacryloyl group and a production process for the same.

BACKGROUND ART

From the viewpoints of organic solvent emission control, reduction of energy consumption in the production process, etc., curable resin compositions containing acrylate or methacrylate have become important techniques in various applications, such as adhesives, pressure-sensitive adhesives, coating agents, inks, sealing materials and potting materials. Particularly in the electric/electronic field, downsizing and weight-lightening of electric/electronic parts have progressed with development of digital technology, and also for the adhesives, the pressure-sensitive adhesives, the coating agents, the sealers, the inks, the sealing materials and the potting materials used for the parts, improvement in performance accompanying downsizing and film-thinning has been required.

For example, a production process for precision parts such as electric/electronic parts sometimes includes a step of heating a part to not lower than 200° C. (e.g., step of mounting an electric part on a substrate), and in such a step, non-occurrence of cracks and the like is required. Further, uses of electric/electronic parts are accompanied by generation of heat, and in order to relax a stress caused by thermal expansion of a substrate by means of a sealing layer, an adhesive layer or the like, the above materials are required to have not only flexibility but also sufficient strength against the long-term heat history. Moreover, the adhesives and the coating agents of optical materials are required to have high transparency.

As a process for producing a cured product satisfying such strength, transparency, etc., a technique relating to a curable resin composition in which methacrylate or acrylate has been compounded with a low-molecular weight diene-based polymer having a methacryloyl group or an acryloyl group is known (see, for example, patent literature 1 or patent literature 2).

Such a curable resin composition is a curable resin composition which is excellent in that a cured product having excellent flexibility, moistureproofness, waterproofness and transparency is obtained. However, the following have been sometimes required: the diene-based polymer should also have higher compatibility with various monomers capable of being contained in the curable resin composition, such as a (meth)acrylate monomer having relatively high polarity; the diene-based polymer should have excellent workability when it is mixed with a (meth)acrylate monomer; the composition should have a satisfactory curing rate when it is cured; and in addition, a cured product obtained from the composition should also have excellent mechanical properties derived from the modified liquid diene-based rubber. Further, the resulting cured product has been also sometimes required to have excellent adhesion to various materials.

CITATION LIST

Patent Literature

Patent literature 1: Japanese Patent Laid-Open Publication No. 2003-192750
Patent literature 2: Japanese Patent Laid-Open Publication No. 2009-029976

SUMMARY OF INVENTION

Technical Problem

The present invention has been made in the light of the above-mentioned actual circumstances, and the present invention provides a modified liquid diene-based rubber which is highly compatible with various monomers, such as polar monomers having relatively high polarity, specifically, acrylate or methacrylate, which is capable of providing a curable resin composition containing the modified liquid diene-based rubber, said composition having a satisfactory curing rate during curing, and which is capable of providing the curable resin composition that forms a cured product having excellent mechanical properties derived from the modified liquid diene-based rubber, and the present invention provides a curable resin composition containing the modified liquid diene-based rubber. Moreover, the present invent ion provides a modified liquid diene-based rubber which is capable of providing a curable resin composition containing the modified liquid diene-based rubber, said composition forming a cured product having excellent adhesion to various materials, and the present invention provides a curable resin composition containing the modified liquid diene-based rubber.

Solution to Problem

The present inventors have earnestly studied, and as a result, they have found that a specific modified liquid diene-based rubber not only exhibits high compatibility with various monomers such as a (meth)acrylate monomer having relatively high polarity but also has excellent workability when it is mixed with other components such as a (meth)acrylate monomer and has a satisfactory curing rate during curing, from a curable resin composition containing the modified liquid diene-based rubber, a cured product having excellent mechanical properties derived from the modified liquid diene-based rubber is obtained, and the cured product has excellent adhesion to various materials. Thus, the present inventors have completed the present invention.

That is to say, the present invention relates to the following [1] to [12].

[1] A modified liquid diene-based rubber (A) having, in a molecule, a modified group (a) containing a (meth)acryloyl group as a part thereof and at least one modified group (b) selected from a dicarboxylic acid monoester and a dicarboxylic acid monoamide (with the proviso that the modified group (b) contains no (meth)acryloyl group as a part thereof), wherein the functional group equivalent weights of the modified group (a) and the modified group (b) are each in the range of 700 to 40,000 g/eq.

[2] The modified liquid diene-based rubber (A) as stated in [1], wherein the modified group (b) is at least one kind selected from a dicarboxylic acid monoester represented by the following formula (b1) or (b1') and a dicarboxylic acid monoamide represented by the following formula (b2) or (b2'),

[Chem. 1]

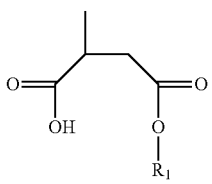

(b1)

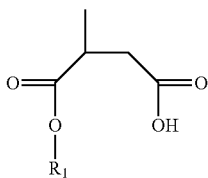

(b1')

wherein $R_1$ is an alkyl group that contains no (meth)acryloyl group as a part thereof and may be substituted,

[Chem. 2]

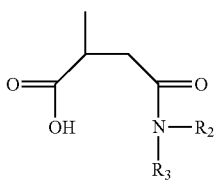

(b2)

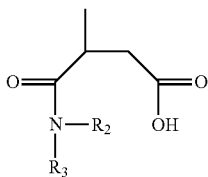

(b2')

wherein $R_2$ and $R_3$ are each a hydrogen atom or an alkyl group that contains no (meth)acryloyl group as a part thereof and may be substituted.

[3] The modified liquid diene-based rubber (A) as stated in [1] or [2], wherein the modified group (b) is a dicarboxylic acid monoester having an ester moiety represented by the formula —COO—$C_nH_{2n+1}$ (wherein n is an integer of 1≤n≤20) or a dicarboxylic acid monoester having an ester moiety represented by the formula —COO—$C_nH_{2n+1-m}X_m$ (wherein n is an integer of 1≤n≤20, m is a number of 1≤m≤2n+1, and X is a substituent).

[4] The modified liquid diene-based rubber (A) as stated in any one of [1] to [3], wherein the modified group (a) is a dicarboxylic acid monoester containing a (meth)acryloyl group as a part thereof.

[5] The modified liquid diene-based rubber (A) as stated in [4], wherein the modified group (a) is a dicarboxylic acid monoester having an ester group derived from hydroxyalkyl (meth)acrylate or hydroxyalkyl (meth)acrylamide.

[6] The modified liquid diene-based rubber (A) as stated in any one of [1] to [5], having a melt viscosity of 0.1 to 3,000 Pa·s at 38° C.

[7] The modified liquid diene-based rubber (A) as stated in any one of [1] to [6], having a number-average molecular weight (Mn) of 2,000 to 500,000.

[8] A production process for the modified liquid diene-based rubber (A) as stated in any one of [1] to [7], comprising:

(1) a step of allowing an unsaturated dicarboxylic anhydride to undergo addition to an unmodified liquid diene-based rubber to produce an unsaturated dicarboxylic anhydride modified liquid diene-based rubber, and (2) a step of adding a modifying compound (a') containing a (meth)acryloyl group as a part thereof and at least one modifying compound (b') selected from an alcohol and an amine and containing no (meth)acryloyl group as apart thereof in a molar ratio ((a'):(b')) of 0.05:0.95 to 0.95:0.05 to the unsaturated dicarboxylic anhydride modified liquid diene-based rubber to allow them to react with one another.

[9] A curable resin composition comprising a modified liquid diene-based rubber (A) having, in a molecule, a modified group (a) containing a (meth)acryloyl group as apart thereof and at least one modified group (b) selected from a dicarboxylic acid monoester and a dicarboxylic acid monoamide (with the proviso that the modified group (b) contains no (meth)acryloyl group as a part thereof), the functional group equivalent weights of said modified group (a) and said modified group (b) being each in the range of 700 to 40,000 g/eq, and a radical polymerization initiator (B), wherein the radical polymerization initiator (B) is contained in an amount of 0.1 to 20 parts by mass based on 100 parts by mass of the total amount of the resin composition.

[10] The curable resin composition as stated in [9], further comprising a radical-polymerizable monomer (C) having a carbon-carbon double bond, wherein the mass ratio [(A)/(C)] of the modified liquid diene-based rubber (A) to the monomer (C) is 0.01 to 100.

[11] A cured product obtained from the curable resin composition as stated in [9] or [10].

[12] An optical adhesive comprising the curable resin composition as stated in [9] or [10].

Advantageous Effects of Invention

According to the present invention, a modified liquid diene-based rubber, which not only exhibits high compatibility with various monomers such as a (meth)acrylate monomer having relatively high polarity but also has low viscosity and has excellent workability when the modified liquid diene-based rubber is mixed with other components such as a (meth)acrylate monomer, is obtained. The curable resin composition containing the modified liquid diene-based rubber and a radical polymerization initiator has a satisfactory curing rate, and from the composition, a cured product having excellent mechanical properties (flexibility, high strength, etc.) derived from the modified liquid diene-based rubber is obtained. The resulting cured product tends to have excellent adhesion to various materials. On that account, the curable resin composition of the present invention is preferred in various technical fields including an electric/electronic field and an optical field.

DESCRIPTION OF EMBODIMENTS

The present invention is described in detail hereinafter. In the present specification, "(meth)acrylate" is a general term for "acrylate" and "methacrylate", "(meth)acrylic" is a general term for "acrylic" and "methacrylic", and "(meth)acryloyl" is a general term for "acryloyl" and "methacryloyl".

[Modified Liquid Diene-Based Rubber (A)]

The modified liquid diene-based rubber (A) of the present invention is a liquid polymer and has a modified group (a) containing a (meth)acryloyl group as a part thereof and at least one modified group (b) selected from a dicarboxylic acid monoester and a dicarboxylic acid monoamide, and the functional group equivalent weights of the modified group (a) and the modified group (b) are each in the range of 700 to 40,000 g/eq. By incorporating such a modified liquid diene-based rubber (A) in a curable resin composition, the curable resin composition not only has a satisfactory curing rate, a low viscosity and excellent workability but also has good adhesion to glass, optical film, etc. and exhibits high compatibility also with a (meth)acrylate monomer having relatively high polarity, and a cured product that can be produced from the curable resin composition is excellent in flexibility, exhibits a sufficiently low dielectric constant and low moisture permeability and has higher strength.

The modified group (a) is a group containing a (meth)acryloyl group as a part thereof, and examples thereof include a group containing, as a part thereof, a (meth)acryloyloxy group represented by the following formula (1) and a group containing, as a part thereof, a (meth)acrylamide group represented by the following formula (2).

$$-R^b-O-CO-R^aC=CH_2 \quad (1)$$

$$-R_b-NH-CO-R^aC=CH_2 \quad (2)$$

In the above formulas (1) and (2), $R^a$ is a hydrogen atom or a methyl group, and $R^b$ is an alkylene group or a polyalkylene glycol group ($\{-(CH_2)_n-O\}_m-$ wherein n represents a number of carbon atoms of an alkylene group, and m represents a number of repeating units of polyalkylene glycol), in which a hydrogen atom or a carbon atom may be replaced with another group. The number of carbon atoms of the alkylene group is preferably 1 to 10, more preferably 1 to 5. n in the polyalkylene glycol group is preferably 1 to 10, more preferably 1 to 5. m is preferably 1 to 5. Above all, $R^b$ is preferably an alkylene group of 1 to 5 carbon atoms, such as methylene group, ethylene group, propylene group, butylene group or pentylene group. The alkylene group and the polyalkylene glycol group may further have a substituent. Examples of the substituents include alkoxy group, carboxyl group, hydroxyl group, alkylthio group, halogen atom and (meth)acryloyl group.

Of the above modified groups (a), particularly preferred modified groups (a) are dicarboxylic acid monoesters each containing a (meth)acryloyl group as a part thereof, and of these, a dicarboxylic acid monoester having an ester group derived from hydroxyalkyl (meth)acrylate or hydroxyalkyl (meth)acrylamide is preferable. Examples of such dicarboxylic acid monoesters each containing a (meth)acryloyl group as a part thereof include modified groups (a) having structures represented by the following formulas (a1), (a1'), (a2) and (a2').

[Chem. 3]

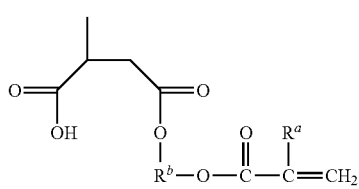

(a1)

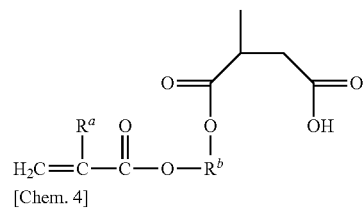

(a1')

[Chem. 4]

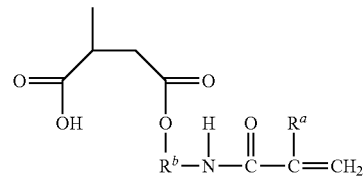

(a2)

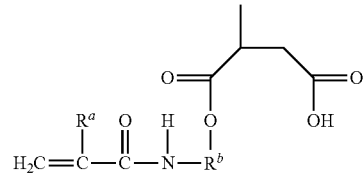

(a2')

In the above formulas (a1), (a2) and (a2'), $R^a$ is the same as $R^a$ in the aforesaid formulas (1) and (2), and definition, specific examples and preferred embodiments of $R^b$ are the same as those of $R^b$ in the aforesaid formulas (1) and (2).

The functional group equivalent weight of the modified group (a) contained in the modified liquid diene-based rubber (A) of the present invention is in the range of 700 to 40,000 g/eq, preferably 1,000 to 30,000 g/eq, more preferably 1,500 to 20,000 g/eq, still more preferably 1,500 to 15,000 g/eq. Since the functional group equivalent weight of the modified group (a) containing, as a part thereof, a (meth)acryloyl group in the modified liquid diene-based rubber (A) is in the above range, a curable resin composition containing this modified liquid diene-based rubber (A) has a satisfactory curing rate, and after curing, the composition exhibits high flexibility and good adhesion to substrates such as glass and optical film. In the present specification, the functional group equivalent weight of the modified group (a) means a molecular weight of the modified liquid diene-based rubber (A) based on one modified group (a). The functional group equivalent weight of the modified group (a) can be determined on the basis of the (meth)acryloyl group contained in the modified group (a), and can be determined by the use of various analytical instruments for infrared spectrophotometry, nuclear magnetic resonance spectroscopy, etc.

The position at which the modified group (a) is introduced may be a polymer end of the modified liquid diene-based rubber, or may be a side chain of a polymer chain thereof. The above modified groups (a) may be contained singly or may be contained in combination of two or more kinds.

The modified group (b) is at least one kind selected from a dicarboxylic acid monoester and a dicarboxylic acid monoamide, and contains no (meth)acryloyl group as a part of the modified group (b).

A preferred embodiment of the modified group (b) is at least one kind selected from a dicarboxylic acid monoester represented by the following formula (b1) or (b1') and a dicarboxylic acid monoamide represented by the following formula (b2) or (b2').

[Chem. 5]

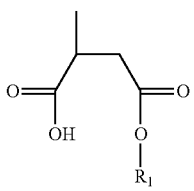

(b1)

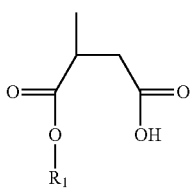

(b1')

In the above formulas (b1) and (b1'), $R_1$ is an alkyl group that contains no (meth)acryloyl group as a part thereof and may be substituted.

The above $R_1$ is preferably an alkyl group of 1 to 20 carbon atoms, more preferably a straight-chain, branched or cyclic alkyl group of 1 to 6 carbon atoms, such as methyl group, ethyl group, propyl group, butyl group, pentyl group or hexyl group, still more preferably an alkyl group of 1 to 4 carbon atoms, such as methyl group, ethyl group, propyl group or butyl group, and much more preferably a methyl group.

[Chem. 6]

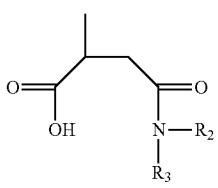

(b2)

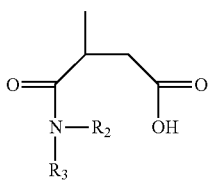

(b2')

In the above formulas (b2) and (b2'), $R_2$ and $R_3$ are each a hydrogen atom or an alkyl group that contains no (meth)acryloyl group as a part thereof and may be substituted.

The above $R_2$ and $R_3$ are each preferably an alkyl group of 1 to 20 carbon atoms, more preferably an alkyl group of 1 to 4 carbon atoms, such as methyl group, ethyl group, propyl group or butyl group.

The above $R_1$, $R_2$ and $R_3$ may be each substituted, and examples of the substituents include alkoxy group, alkoxysilyl group, carboxyl group, hydroxyl group, alkylthio group and halogen atom. The number of the substituents is preferably 1 to 5, more preferably 1 to 3.

As the modified group (b), more preferable among them is a dicarboxylic acid monoester, and particularly preferable is a dicarboxylic acid monoester having an ester moiety represented by the formula —COO—$C_nH_{2n+1}$ (wherein n is an integer of $1 \leq n \leq 20$) or a dicarboxylic acid monoester having an ester moiety represented by the formula —COO—$C_nH_{2n+1-m}X_m$ (wherein n is an integer of $1 \leq n \leq 20$, m is a number of $1 \leq m \leq 2n+1$, and X is a substituent). Examples of the substituents X include the aforesaid alkoxy group, alkoxysilyl group, carboxyl group, hydroxyl group, alkylthio group and halogen atom. m is preferably an integer of 1 to 5, more preferably an integer of 1 to 3. n is preferably an integer of 1 to 6, more preferably an integer of 1 to 4.

The functional group equivalent weight of the modified group (b) contained in the modified liquid diene-based rubber (A) of the present invention is in the range of 700 to 40,000 g/eq, preferably 1,000 to 30,000 g/eq, more preferably 1,000 to 20,000 g/eq, still more preferably 1,200 to 10,000 g/eq, much more preferably 1,200 to 5,500 g/eq. Since the functional group equivalent weight of at least one modified group (b) selected from a dicarboxylic acid monoester and a dicarboxylic acid monoamide in the modified liquid diene-based rubber (A) is in the above range, a curable resin composition, which has low viscosity and excellent workability, exhibits sufficiently low moisture permeability after cured, has good adhesion to glass, optical film, etc., exhibits high compatibility even when mixed with a (meth)acrylate monomer having relatively high polarity and has high transparency, is obtained. In the present specification, the functional group equivalent weight of the modified group (b) means a molecular weight of the modified liquid diene-based rubber (A) based on one modified group (b). The functional group equivalent weight of the modified group (b) can be determined by the use of various analytical instruments for infrared spectrophotometry, nuclear magnetic resonance spectroscopy, etc., similarly to the modified group (a).

The position at which the modified group (b) is introduced may be a polymer end of the liquid diene-based rubber, or may be a side chain of a polymer chain thereof. The above modified groups (b) may be contained singly or may be contained in combination of two or more kinds.

The melt viscosity of the modified liquid diene-based rubber (A) of the present invention, as measured at 38° C., is preferably 0.1 to 3,000 Pa·s, more preferably 0.8 to 2,000 Pa·s, still more preferably 10 to 1,000 Pa·s. When the melt viscosity of the modified liquid diene-based rubber (A) is in the above range, the modified liquid diene-based rubber (A) not only has excellent workability in the production of a curable resin composition but also can be improved in compatibility with the later-described monomer (C) such as a (meth)acrylate monomer, and bleed-out tends to be able to be reduced after curing. In the present invention, the melt viscosity of the modified liquid diene-based rubber (A) is a value determined by the method described in the later-described working examples.

The number-average molecular weight (Mn) of the modified liquid diene-based rubber (A) of the present invention is preferably 2,000 to 500,000, more preferably 3,000 to 200,000, still more preferably 4,000 to 100,000, much more preferably 5,000 to 70,000. When Mn of the modified liquid diene-based rubber (A) is in the above range, a curable resin composition, which has low viscosity and excellent workability, has a high curing rate when cured by active energy rays and has high flexibility after cured, is obtained. In the present invention, Mn of the modified liquid diene-based rubber (A) is a number-average molecular weight in terms of standard polystyrene, as measured by gel permeation chromatography (GPC).

The molecular weight distribution (Mw/Mn) of the modified liquid diene-based rubber (A) is preferably 1.0 to 8.0, more preferably 1.0 to 5.0, still more preferably 1.0 to 3.0. When Mw/Mn is in the above range, the resulting modified liquid diene-based rubber (A) has a small scatter of viscosity and is more preferable.

The glass transition temperature (Tg) of the modified liquid diene-based rubber (A) of the present invention is preferably −100 to 10° C., more preferably −100 to 0° C., still more preferably −100 to −5° C. When Tg is in the above range, for example, coating properties of the curable resin composition and mechanical strength and flexibility thereof at a low temperature after curing become better. The vinyl content in the modified liquid diene-based rubber (A) is preferably not more than 99% by mass, more preferably not more than 90% by mass.

[Production Process for Modified Liquid Diene-Based Rubber (A)]

The modified liquid diene-based rubber (A) of the present invention can be produced by, for example, allowing an unsaturated dicarboxylic anhydride to undergo addition to an unmodified liquid diene-based rubber (A') to produce an unsaturated dicarboxylic anhydride modified liquid diene-based rubber (A") and allowing a modifying compound (a') containing a (meth)acryloyl group as a part thereof (sometimes also abbreviated to a "modifying compound (a') hereinafter) and at least one modifying compound (b') selected from an alcohol and an amine and containing no (meth) acryloyl group as apart thereof (sometimes also abbreviated to a "modifying compound (b') hereinafter) to react with this unsaturated dicarboxylic anhydride modified liquid diene-based rubber (A") in such a manner that the desired functional group equivalent weights are obtained.

The unmodified liquid diene-based rubber (A') is preferably a polymer obtained by polymerizing monomers containing a conjugated diene through the later-described method or a polymer obtained by hydrogenating at least a part of unsaturated bonds contained in the polymer.

Examples of the conjugated dienes include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. Of these, butadiene or isoprene is preferable. These conjugated dienes may be used singly, or may be used in combination of two or more kinds.

In the monomers containing a conjugated diene, not only the above conjugated dienes but also other copolymerizable monomers such as an aromatic vinyl compound may be contained. Examples of the aromatic vinyl compounds include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Of these, styrene, α-methylstyrene and 4-methylstyrene are preferable.

In the unmodified liquid diene-based rubber (A'), the ratio of the aromatic vinyl compound units to the total of the conjugated diene units and the aromatic vinyl compound units is preferably not more than 50% by mass, more preferably not more than 40% by mass, still more preferably not more than 30% by mass, from the viewpoints of compatibility with the later-described monomer (C) such as a (meth)acrylate monomer, decrease in viscosity, good flexibility after curing, etc.

The unmodified liquid diene-based rubber (A') can be produced by, for example, an emulsion polymerization process or a solution polymerization process.

To the emulsion polymerization process, a publicly known process or a process equivalent to the publicly known process is applicable. For example, monomers containing a given amount of a conjugated diene are emulsified and dispersed in the presence of an emulsifying agent and then subjected to emulsion polymerization using a radical polymerization initiator.

Examples of the emulsifying agents include long-chain fatty acid salts of 10 or more carbon atoms and rosin acid salts. Examples of the long-chain fatty acid salts include potassium salts or sodium salts of fatty acids such as capric acid, lauric acid, myristic acid, palmitic acid, oleic acid and stearic acid.

As the dispersing agent, water is usually used, and in the dispersing agent, a water-soluble organic solvent such as methanol or ethanol may be contained within limits not detrimental to stability in the polymerization.

Examples of the radical polymerization initiators include persulfates, such as ammonium persulfate and potassium persulfate, organic peroxides and hydrogen peroxide.

In order to control the molecular weight of the resulting unmodified liquid diene-based rubber (A'), a chain transfer agent may be used. Examples of the chain transfer agents include mercaptans, such as t-dodecylmercaptan and n-dodecylmercaptan; carbon tetrachloride, thioglycolic acid, diterpene, terpinolene, γ-terpinene and α-methylstyrene dimer.

Although the temperature of the emulsion polymerization can be appropriately determined by the type of the radical polymerization initiator used, etc., it is usually in the range of 0 to 100° C., preferably in the range of 0 to 60° C. The polymerization mode may be any of continuous polymerization and batchwise polymerization.

The polymerization reaction can be terminated by adding a polymerization terminator. Examples of the polymerization terminators include amine compounds, such as isopropylhydroxylamine, diethylhydroxylamine and hydroxylamine, quinone-based compounds, such as hydroquinone and benzoquinone, and sodium nitrite.

After termination of the polymerization reaction, unreacted monomers are removed from the resulting latex when needed, then the liquid diene-based rubber (A') is solidified using a salt such as sodium chloride, calcium chloride or potassium chloride as a solidifying agent while adjusting pH of the solidification system to a desired value by adding an acid such as nitric acid or sulfuric acid when needed, and thereafter, the dispersion solvent is separated. Subsequently, washing with water, dehydration and drying are carried out, whereby an unmodified liquid diene-based rubber (A') is obtained. In the solidification, if necessary, the latex may be beforehand mixed with an oil extender that is in the form of an emulsified dispersion, to obtain an oil-extended rubber as the unmodified liquid diene-based rubber (A').

To the solution polymerization process, a publicly known process or a process equivalent to the publicly known process is applicable. For example, monomers containing a conjugated diene are polymerized in a solvent using a Ziegler catalyst, a metallocene catalyst, or an active metal or an active metal compound capable of anionic polymerization, and if necessary, in the presence of a polar compound.

Examples of the solvents include aliphatic hydrocarbons, such as n-butane, n-pentane, isopentane, n-hexane, n-heptane and isooctane; alicyclic hydrocarbons, such as cyclopentane, cyclohexane and methylcyclopentane; and aromatic hydrocarbons, such as benzene, toluene and xylene.

Examples of the active metals capable of anionic polymerization include alkali metals, such as lithium, sodium and potassium; alkaline earth metals, such as beryllium, magnesium, calcium, strontium and barium; and lanthanoid rare earth metals, such as lanthanum and neodymium.

Of the active metals capable of anionic polymerization, alkali metals and alkaline earth metals are preferable, and alkali metals are more preferable.

The active metal compound capable of anionic polymerization is preferably an organic alkali metal compound. Examples of the organic alkali metal compounds include organomonolithium compounds, such as methyllithium, ethyllithium, n-butyllithium, sec-butyllithium, t-butyllithium, hexyllithium, phenyllithium and stilbenelithium; polyfunctional organolithium compounds, such as dilithiomethane, dilithionaphthalene, 1,4-dilithiobutane, 1,4-dilithio-2-ethyl cyclohexane and 1,3,5-trilithiobenzene; sodium naphthalene and potassium naphthalene. Of these organic alkali metal compounds, organolithium compounds are preferable, and organomonolithium compounds are more preferable.

Although the amount of the organic alkali metal compound used can be appropriately determined according to the melt viscosity, the molecular weight, etc. of the unmodified liquid diene-based rubber (A') and the modified liquid diene-based rubber (A), the organic alkali metal compound is used usually in an amount of 0.01 to 3 parts by mass based on 100 parts by mass of all of the monomers containing a conjugated diene.

The organic alkali metal compound is allowed to react with secondary amine such as dibutylamine, dihexylamine or dibenzylamine, and the resulting organic alkali metal amide can be also used.

The polar compound is usually used in order to control a micro structure of a conjugated diene site without inactivating the reaction in the anionic polymerization. Examples of the polar compounds include ether compounds, such as dibutyl ether, tetrahydrofuran and ethylene glycol diethyl ether; tertiary amines, such as tetramethylethylenediamine and trimethylamine; alkali metal alkoxides and phosphine compounds. The polar compound is used usually in an amount of 0.01 to 1000 mol based on the organic alkali metal compound.

The temperature of the solution polymerization is usually in the range of −80 to 150° C., preferably in the range of 0 to 100° C., more preferably in the range of 10 to 90° C. The polymerization mode may be any of batchwise polymerization and continuous polymerization.

The polymerization reaction can be terminated by adding a polymerization terminator. Examples of the polymerization terminators include alcohols, such as methanol and isopropanol. The resulting polymerization reaction solution is poured into a poor solvent such as methanol to precipitate the unmodified liquid diene-based rubber (A'), or the polymerization reaction solution is washed with water, separated and then dried, whereby the unmodified liquid diene-based rubber (A') can be isolated.

As the production process for the unmodified liquid diene-based rubber (A'), the solution polymerization process is preferable among the above processes.

As previously described, after the polymerization, a part of unsaturated bonds contained in the liquid diene-based rubber may have been hydrogenated to such an extent that addition of a desired amount of an unsaturated dicarboxylic anhydride is possible.

By allowing an unsaturated dicarboxylic anhydride to undergo addition to the unmodified liquid diene-based rubber (A') produced as above, an unsaturated dicarboxylic anhydride modified liquid diene-based rubber (A") is produced.

Examples of the unsaturated dicarboxylic anhydrides include maleic anhydride, citraconic anhydride and itaconic anhydride. Of these, maleic anhydride is preferable from the viewpoint of economy.

The method for allowing the unsaturated dicarboxylic anhydride to undergo addition to the unmodified liquid diene-based rubber (A') is not specifically restricted, and for example, a method comprising adding the unsaturated dicarboxylic anhydride and if necessary a radical catalyst to the liquid diene-based rubber and heating them in the presence or absence of an organic solvent can be adopted.

Examples of the organic solvents used in the above method include hydrocarbon solvents and halogenated hydrocarbon solvents. Of these organic solvents, hydrocarbon solvents, such as n-butane, n-hexane, n-heptane, cyclohexane, benzene, toluene and xylene, are preferable.

Examples of the radical catalysts used in the above method include di-s-butyl peroxydicarbonate, t-amyl peroxypivalate, t-amyl peroxy-2-ethylhexanoate and azobisisobutyronitrile. Of these, azobisisobutyronitrile is preferable.

The amount of the unsaturated dicarboxylic anhydride has only to be determined in such a manner that the functional group equivalent weights of the modified group (a) and the modified group (b) are each in the range of 700 to 40,000 g/eq, and the amount thereof is preferably in the range of 0.5 to 40 parts by mass, more preferably in the range of 0.7 to 30 parts by mass, still more preferably in the range of 1.0 to 20 parts by mass, based on 100 parts by mass of the unmodified liquid diene-based rubber (A'). The amount of the unsaturated dicarboxylic anhydride allowed to undergo addition into the unsaturated dicarboxylic anhydride modified liquid diene-based rubber (A") is preferably in the range of 0.5 to 40 parts by mass, more preferably in the range of 0.7 to 30 parts by mass, still more preferably in the range of 1.0 to 20 parts by mass, based on 100 parts by mass of the unmodified liquid diene-based rubber (A').

The temperature for allowing the unsaturated dicarboxylic anhydride to undergo addition to the unmodified liquid diene-based rubber (A') by the above method is preferably in the range of 100 to 250° C., more preferably in the range of 140 to 200° C. The reaction time is preferably 4 to 50 hours.

For the purpose of inhibiting lowering of a molecular weight, discoloration and gelation caused by deterioration in the modification reaction, an appropriate anti-aging agent may be added during the addition of the unsaturated dicarboxylic anhydride to the unmodified liquid diene-based rubber (A') or during the storage of the modified polymer, when needed.

Examples of the anti-aging agents include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl) propionyloxy]ethyl]-2,4,8,10-tetraoxaspiro[5.5]undecane (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl) ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t- butylphenyl)phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl)sebacate (LA-77Y), N,N-dioctadecylhydroxylamine (Irgastab FS 042), bis(4-t-octylphenyl)amine (Irganox 5057), hydroquinone and p-methoxyphenol. These anti-aging agents may be used singly, or may be used in combination of two or more kinds.

The amount of the anti-aging agent added is preferably 0.01 to 10 parts by mass, more preferably 0.1 to 3 parts by mass, based on 100 parts by mass of the unmodified liquid diene-based rubber (A') or the modified liquid diene-based rubber (A).

With the thus obtained unsaturated dicarboxylic anhydride modified liquid diene-based rubber (A"), a modifying compound (a') and a modifying compound (b') are allowed to react in such a manner that the desired functional group equivalent weights are obtained. By the reaction of the modifying compound (a') and the modifying compound (b') with unsaturated dicarboxylic anhydride groups of the unsaturated dicarboxylic anhydride modified liquid diene-based rubber (A"), the modified liquid diene-based rubber (A) having the modified group (a) and the modified group (b) according to the present invention can be obtained.

As the modifying compound (a') allowed to react with the unsaturated dicarboxylic anhydride modified liquid diene-based rubber (A"), a compound having a (meth)acryloyl group and a hydroxyl group is preferable, and hydroxyalkyl (meth)acrylate or hydroxyalkyl (meth)acrylamide is more preferable. Particularly from the viewpoint of curing rate, hydroxyalkyl methacrylate or hydroxyalkylmethacrylamide is preferable, and from the viewpoint of flexibility after curing, hydroxyalkyl acrylate or hydroxylalkylacrylamide is preferable.

Examples of the hydroxyalkyl (meth)acrylates include 2-hydroxyethyl (meth)acrylate, 2-hydroxypropyl (meth)acrylate, 2-hydroxybutyl (meth)acrylate, 2-hydroxy-3-acryloyloxypropyl methacrylate, glycerol dimethacrylate and pentaerythritol triacrylate. Of these, 2-hydroxyethyl (meth)acrylate is preferable.

Examples of the hydroxyalkyl (meth)acrylamides include 2-hydroxyethyl (meth)acrylamide, 2-hydroxypropyl (meth)acrylamide and 2-hydroxybutyl (meth)acrylamide. Of these, 2-hydroxyethyl (meth)acrylamide is preferable.

The modifying compound (b') allowed to react with the unsaturated dicarboxylic anhydride modified liquid diene-based rubber (A") is not specifically restricted as long as it contains no (meth)acryloyl group as a part thereof. However, from the viewpoints of ease of modification reaction, etc., preferable are alcohols of 1 to 20 carbon atoms and amines of 1 to 20 carbon atoms, more preferable are saturated alcohols of 1 to 20 carbon atoms, and still more preferable are methanol, ethanol, propanol, butanol, 3-methylbutanol and 3-methyl-1,3-butanediol.

The reaction temperature of the above reaction is preferably in the range of 25 to 150° C., more preferably in the range of 50 to 100° C. The reaction time has only to be appropriately determined in such a range that the functional group equivalent weights of the modified group (a) and the modified group (b) each become a desired value, but it is usually 1 to 24 hours.

In the modified liquid diene-based rubber (A) of the present invention, the functional group equivalent weights of the modified group (a) and the modified group (b) need to be each in the range of 700 to 40,000 g/eq. A method to set the functional group equivalent weights of the modified group (a) and the modified group (b) to the desired ranges is, for example, a method comprising controlling the amounts of the modifying compound (a') and the modifying compound (b') added to the unsaturated dicarboxylic anhydride modified liquid diene-based rubber (A") and allowing them to react with the liquid diene-based rubber. The molar ratio (a'):(b') between the amount of the modifying compound (a') and the amount of the modifying compound (b') added is preferably in the range of 0.05:0.95 to 0.95:0.05, more preferably in the range of 0.1:0.9 to 0.9:0.1, still more preferably in the range of 0.1:0.9 to 0.8:0.2, particularly preferably in the range of 0.1:0.9 to 0.7:0.3. If the amounts of the modifying compound (a') and the modifying compound (b') added are out of these ranges, the modified liquid diene-based rubber (A) in which the functional group equivalent weights of the modified group (a) and the modified group (b) are each in the aforesaid range is not obtained in some cases.

From the viewpoint of economy, the total amount of the modifying compound (a') and the modifying compound (b') added is preferably 0.5 to 1.5 molar equivalents, more preferably 0.7 to 1.2 molar equivalents, to the unsaturated dicarboxyic anhydride groups possessed by the unsaturated dicarboxylic anhydride modified liquid diene-based rubber (A").

In the above reaction, the modifying compound (a') and the modifying compound (b') may be added at the same time, or either of them is added earlier, but from the viewpoint of reactivity, it is preferable to add the modifying compound (a') and the modifying compound (b') at the same time.

[Radical polymerization initiator (B)]

The modified liquid diene-based rubber (A) of the present invention can be used as a curable resin composition by adding a radical polymerization initiator (B) thereto. The radical polymerization initiator (B) employable in the curable resin composition of the present invention is, for example, a radical photopolymerization initiator that is decomposed by active energy rays such as ultraviolet rays to generate a radical or a thermal decomposition type radical polymerization initiator that is decomposed by heating to generate a radical.

Examples of the radical photopolymerization initiators include ketones, such as 2-hydroxy-2-methyl-1-phenylpropan-1-one, 1-hydroxycyclohexyl phenyl ketone, 2-methyl[4-(methylthio)phenyl]-2-morpholino-1-propanone, 2,2-dimethoxy-1,2-diphenylethan-1-one, 1-[4-(2-hydroxyethoxy)phenyl]-2-hydroxy-2-methyl-1-propan-1-one, 2-hydroxy-1-[4-[4-(2-hydroxy-2-methylpropionyl)benzyl]phenyl]-2-methylpropan-1-one, 2-methyl-1-(4-methylthiophenyl)-2-morpholinopropan-1-one, 2-benzyl-2-dimethylamino-1-(4-morpholinophenyl)butanone, 2-(dimethylamino)-2-[(4-methylphenyl)methyl]-1-[4-[morpholinyl]phenyl]-1-butanone, camphorquinone, benzophenone, benzoinmethyl ether and benzoin ethyl ether; acylphosphine oxides, such as 2,4,6-trimethylbenzoyldiphenylphosphine oxide and bis(2,4,6-trimethylbenzoyl)phenylphosphine oxide; titanocenes, such as bi($\eta_5$-2,4-cyclopentadien-1-yl)bis(2,6-difluoro-3-(1H-pyrrol-1-yl)phenyl)titanium; oxime esters, such as 1,2-octanedione-1-[4-(phenylthio)-2-(O-benzyloxime)] and ethanone-1-[9-ethyl-6-(2-methylbenzoyl)-9H-carbazol-3-yl]-1-(O-acetyloxime); and oxyphenylacetic acid esters, such as oxyphenylacetic acid 2-[2-oxo-2-phenylacetoxyethoxy]ethyl ester and oxyphenylacetic acid 2-(2-hydroxyethoxy)ethyl ester. Of these, ketones, such as 2-hydroxy-2-methyl-1-phenylpropan-1-one and 1-hydroxycyclohexyl phenyl ketone, and acylphosphine oxides, such as 2,4,6- trimethylbenzoyldiphenylphosphine oxide and bis(2,4,6-trimethylbenzoyl)phenylphosphine oxide, are preferable.

Examples of the thermal decomposition type radical polymerization initiators include peroxides, such as 1,1,3,3-tetramethylbutyl peroxy-2-ethylhexanoate, 1,1-bis(t-butylperoxy)cyclohexane, 1,1-bis(t-butylperoxy)cyclododecane, di-t-butyl peroxyisophthalate, t-butyl peroxybenzoate, dicumyl peroxide, t-butylcumyl peroxide, 2,5-dimethyl-2,5-di(t-butylperoxy)hexane, 2,5-dimethyl-2,5-di(t-butylperoxy)-3-hexyne and cumene hydroperoxde.

In the curable resin composition of the present invention, the content of the radical polymerization initiator (B) is preferably 0.1 to 20 parts by mass, more preferably 0.5 to 15 parts by mass, still more preferably 1.0 to 10 parts by mass, much more preferably 1.5 to 6 parts by weight, based on 100 parts by weight of the total amount of the resin composition. When the content of the radical polymerization initiator (B) is in the above range, curing rate and mechanical properties after curing tend to be more enhanced.

[Radical-Polymerizable Monomer (C) Having Carbon-Carbon Double Bond]

The curable resin composition of the present invention may further contain a radical-polymerizable monomer (C) having a carbon-carbon double bond. The radical-polymerizable monomer (C) having a carbon-carbon double bond (sometimes also referred to as a "monomer (C)" hereinafter) means a monomer capable of undergoing polymerization due to a radical generated by applying active energy rays or heat to the aforesaid radical polymerization initiator (B). Examples of the monomers (C) include monosubstituted vinyl compounds, such as styrene, acrylate, acrylamide, acrylonitrile, vinyl acetate and vinyl chloride; 1,1-disubstituted vinyl compounds, such as α-methyl styrene, methacrylate and methacrylamide; cycloolefins, such as acenaphthylene and N-substituted maleimide; and conjugated diene compounds, such as butadiene and isoprene. Of these, (meth)acrylate is preferable, and monofunctional (meth)acrylate, bifunctional (meth)acrylate, tri- or higher functional polyvalent (meth)acrylate or the like can be used.

Examples of the monofunctional (meth)acrylates include alkyl mono(meth)acrylates, such as methyl (meth)acrylate, ethyl (meth)acrylate, propyl (meth)acrylate, butyl (meth)acrylate, 2-ethylhexyl (meth)acrylate, isodecyl (meth)acrylate, isooctyl (meth)acrylate, lauryl (meth)acrylate, stearyl (meth)acrylate and isostearyl (meth)acrylate; alicyclic mono (meth)acrylates, such as cyclohexyl (meth)acrylate, dicyclopentanyl (meth)acrylate and isobornyl (meth)acrylate; dicyclopentenyl group-containing mono(meth)acrylates, such as dicyclopentenyl (meth)acrylate and dicyclopentenyloxyethyl (meth)acrylate; aryl (meth)acrylates, such as phenyl acrylate and benzyl acrylate; phenoxy group-containing (meth)acrylates, such as phenoxyhydroxyproyl (meth)acrylate, phenoxyethyl (meth)acrylate, phenoxyethylene glycol (meth)acrylate and phenoxypolyethylene glycol (meth)acrylate; alkoxyalkyl mono(meth)acrylates, such as butyl ethoxy (meth)acrylate and butylethyl (meth)acrylate; hydroxyl group-containing (meth)acrylates, such as 2-hydroxyethyl (meth)acrylate, 2-hydroxypropyl (meth)acrylate, 2-hydroxybutyl (meth)acrylate and butoxyhydroxypropyl (meth) acrylate; amino group-containing (meth)acrylates, such as N,N-diethylaminoethyl (meth)acrylate and N,N-dimethylaminoethyl (meth)acrylate; epoxy group-containing (meth) acrylates, such as glycidyl (meth)acrylate; alkoxydialkylene glycol mono(meth)acrylates, such as methoxydiethylene glycol (meth)acrylate and methoxydipropylene glycol (meth)acrylate; fluorine group-containing (meth)acrylates, such as tetrafluoropropyl (meth)acrylate and heptadecafluorodecyl (meth)acrylate; nonylphenoxypolyethylene glycol (meth)acrylate, nonylphenoxypolypropylene glycol (meth) acrylate, and morpholine (meth)acrylate.

Examples of the bifunctional (meth)acrylates include alkylene glycol di(meth)acrylates, such as 1,4-butenediol di(meth)acrylate, neopentyl glycol diacrylate, 1,6-hexanediol di(meth)acrylate and 1,9-nonanediol di(meth)acrylate; polyalkylene glycol di(meth)acrylates, such as diethylene glycol di(meth)acrylate, triethylene glycol di(meth)acrylate and tripropylene glycol di(meth)acrylate; di(meth)acrylates having ester group-containing diol skeleton, such as neopentylglycol hydroxypivalate di(meth)acrylate; alicyclic di(meth)acrylates, such as dicyclopentanyl di(meth)acrylate, tricyclodecane dimethanol di(meth)acrylate and ethoxylated hydrogenated bisphenol A di(meth)acrylate; hydroxypropyl di(meth)acrylate, diethylene glycol bis(hydroxypropyl (meth)acrylate), and propoxylated bisphenol A bis(hydroxypropyl (meth)acrylate).

Examples of the tri- or higher polyfunctional (meth) acrylates include trimethylolpropene type polyvalent (meth) acrylates, such as trimethylolpropane tri(meth)acrylate, ditrimethylolpropane tetra(meth)acrylate and hydroxypropylated trimethylolpropane tri(meth)acrylate; pentaerythritol type polyvalent (meth)acrylates, such as pentaerythritol tetra(meth)acrylate, dipentaerythritol hexa (meth)acrylate and monohydroxypentaerythritol tri(meth) acrylate; and isocyanurate type polyvalent (meth)acrylates, such as tris((meth)acryloxyethyl) isocyanurate.

Of these (meth)acrylates, preferable are monofunctional (meth)acrylates, such as alkyl mono(meth)acrylates, alicyclic mono(meth)acrylates, cyclopentenyl group-containing mono(meth)acrylates, aryl mono(meth)acrylates, phenoxy group-containing mono(meth)acrylates, alkoxyalkyl mono (meth)acrylates, hydroxyl group-containing (meth)acrylates, amino group-containing (meth)acrylates, epoxy group-containing (meth)acrylates, alkoxydialkylene glycol mono(meth)acrylates and fluorine group-containing (meth) acrylates, and bifunctional (meth)acrylates, such as alkylene glycol di(meth)acrylates and alicyclic di(meth)acrylates. More preferable are monofunctional (meth)acrylates, such as alkyl mono(meth)acrylates, alicyclic mono(meth)acrylates and cyclopentenyl group-containing mono(meth)acrylates.

The above monomers (C) may be used singly, or may be used in combination of two or more kinds.

In the curable resin composition of the present invention, the mass ratio [(A)/(C)] of the modified liquid diene-based rubber (A) to the monomer (C) is preferably 0.01 to 100, more preferably 0.05 to 50, still more preferably 0.1 to 25, much more preferably 0.1 to 10. When the compounding ratio of the modified liquid diene-based rubber (A) to the monomer (C) is in the above range, a curable resin composition, which has low viscosity and excellent workability, exhibits small change in volume during curing and has good flexibility after curing, is obtained.

[Arbitrary Components]

To the curable resin composition of the present invention, additives, such as curing accelerator, tackifier, plasticizer, anti-aging agent, ultraviolet absorbing agent, hindered amine-based light stabilizer, softener, anti-foaming agent, pigment, dye, organic filler and perfume, may be added within limits not detrimental to the properties of the composition.

To the curable resin composition of the present invention, further, an unmodified liquid diene rubber may be added for the purpose of improving properties such as handling properties and flexibility after curing. As the unmodified liquid diene rubber, the aforesaid unmodified liquid diene-based rubber (A') for use in the production of the modified liquid diene-based rubber (A) of the present invention can be preferably used. By incorporating the unmodified liquid diene rubber (A') into the curable resin composition of the present invention, a cured product having excellent flexibility and also having high elongation can be obtained from the resulting curable resin composition.

From the viewpoints of handling properties, curing rate, and retention of good elongation properties and flexibility of a cured film, the content of the unmodified liquid diene rubber (A') is preferably not more than 80% by mass, more preferably not more than 50% by mass, based on the total amount of the curable resin composition.

[Production Process for Curable Resin Composition]

The curable resin composition of the present invention can be produced by, for example, mixing the modified liquid diene-based rubber (A), the radical polymerization initiator (B), and if necessary, the monomer (C), additives, etc. by the use of a usual mixing means, such as stirrer or kneader, at room temperature.

By curing the curable resin composition of the present invention through irradiation with active energy rays and/or heating, a cured product can be obtained. Any one of irradiation with active energy rays and heating may be carried out, or both of them may be carried out. When both of them are carried out, it is preferable that the curable resin composition is irradiated with active energy rays and then heated during curing or after curing.

As the active energy rays used, corpuscular rays, electromagnetic waves and combinations thereof can be mentioned. Examples of the corpuscular rays include electron beam (EB) and α rays. Examples of the electromagnetic waves include ultraviolet rays (UV), visible rays, infrared rays, γ rays and X rays. Of these, electron beam (EB) or ultraviolet rays (UV) are preferably used.

Irradiation with the active energy rays can be carried out using a publicly known apparatus. For example, in the case of electron beam (EB), an acceleration voltage of 0.1 to 10 MeV is suitable, and an irradiation dose of 1 to 500 kGy is suitable. In the case of ultraviolet rays (UV), for example, a lamp having a radiation wavelength of 200 nm to 450 nm can be preferably used as a radiation source. In the case of electron beam (EB), its radiation source is, for example, tungsten filament, and in the case of ultraviolet rays (UV), examples of the radiation sources include low pressure mercury lamp, high pressure mercury lamp, extra-high pressure mercury lamp, halogen lamp, excimer lamp, carbon arc lamp, xenon lamp, zirconium lamp, fluorescent lamp and ultraviolet rays contained in natural light. Although the time of the irradiation of the curable resin composition with the active energy rays depends upon also the magnitude of the energy, it is preferably in the range of 0.5 to 300 seconds.

The curable resin composition of the present invention is excellent in workability, has a high curing rate when cured by active energy rays, and is excellent in storage stability. A cured product obtained from the composition is excellent in transparency and is excellent also in mechanical properties such as strength. On that account, the curable resin composition of the present invention can be preferably used in applications, such as adhesives, pressure-sensitive adhesives (adhesives and pressure-sensitive adhesives are together sometimes referred to as "adhesives"), coating agents, sealing materials and inks. The curable resin composition of the present invention can be particularly preferably used as optical adhesives among them. Examples of the optical adhesive applications include laminating of optical discs such as digital versatile discs (DVD), laminating of touch panels, laminating of optical films used for flat panel displays such as liquid crystal display and plasma display, adhesion of optical lenses used for cameras or optical heads for playing DVD or compact disc (CD), and adhesion of optical members such as optical fibers. Further, as other adhesive applications, the curable resin composition can be used for adhesion between precision parts such as semiconductors and printed wiring boards, or the composition can be used also in electric/electronic member applications such as dicing tapes for holding wafers in the back-grinding process and the dicing process in the production of semiconductors. Examples of the coating agent applications include coating of automobile head lamps and coating of optical fibers. Examples of the sealing material applications include sealing of precision parts such as liquid crystal display element, organic EL, LED, semiconductor and hard disc. Examples of the ink applications include resist ink used in the production of semiconductors or printed wiring boards and printing ink used for printing on aluminum foil paper, polyethylene coat paper, vinyl chloride sheet, polyester sheet, polypropylene sheet, food can, beverage can, etc.

EXAMPLES

The present invention is described in more detail with reference to the following examples, but it should be construed that the present invention is in no way limited to those examples.

Components used in the examples and the comparative examples are as follows.

<Modified Liquid Diene-Based Rubber (A)>

Modified liquid polyisoprenes obtained in the later-described Preparation Examples 1 to 15

<Radical Polymerization Initiator (B)>

B-1: radical photopolymerization initiator, 2-hydroxy-2-methyl-1-phenylpropan-1-one (trade name: "DAROCUR1173", manufactured by BASF Japan Ltd.)

<Radical-Polymerizable Monomer (C) Having Carbon-Carbon Double Bond>

C-1: monofunctional methacrylate, dicyclopentenyloxyethyl methacrylate (trade name: FA-512M, manufactured by Hitachi Chemical Co., Ltd.)

[Chem. 7]

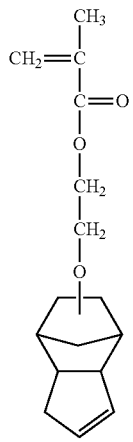

C-2: monofunctional acrylate, isobornyl acrylate (trade name: "IBXA", manufactured by Osaka Organic Chemical Industry Ltd.)

Preparation Example 1

Modified Liquid Polyisoprene (A-1)

Isoprene was allowed to undergo anionic polymerization in n-hexane using n-butyllithium as an initiator to obtain polyisoprene having a number-average molecular weight of 19,300 (also referred to as a "polymer (A'-1)" hereinafter). To 100 parts by mass of this polymer (A'-1), 10 parts by mass of maleic anhydride and 1 part by mass of BHT (2,6-di-t-butyl-4-methylphenol, manufactured by Honshu Chemical Industry Co., Ltd.) were added, and maleic anhydride was allowed to react with the polymer at 180° C. for 15 hours to obtain maleic anhydride modified liquid polyisoprene (A"-1) (also referred to as a "polymer (A"-1)" hereinafter). The reaction ratio of the maleic anhydride was not less than 99%, and the amount of maleic anhydride having undergone addition into the polymer (A"-1) was 10 parts by mass based on 100 parts by mass of the polymer (A'-1). Next, to the polymer (A"-1), 0.3 molar equivalent of 2-hydroxyethyl acrylate and 0.7 molar equivalent of methanol to the maleic anhydride group having undergone addition were added, and after light shielding, they were allowed to react with the polymer at 120° C. for 10 hours to synthesize modified liquid polyisoprene (A-1) having a modified group (a) containing an acryloyl group as a part thereof and a dicarboxylic acid monomethyl ester group (b). Properties of the resulting modified liquid polyisoprene (A-1) are set forth in Table 1.

Preparation Example 2

Modified Liquid Polyisoprene (A-2)

To the polymer (A"-1) synthesized in Preparation Example 1, 0.5 molar equivalent of 2-hydroxyethyl acrylate and 0.5 molar equivalent of methanol to the maleic anhydride group having undergone addition were added, and after light shielding, they were allowed to react with the polymer at 120° C. for 10 hours to synthesize modified liquid polyisoprene (A-2) having a modified group (a) containing an acryloyl group as a part thereof and a dicarboxylic acid monomethyl ester group (b). Properties of the resulting modified liquid polyisoprene (A-2) are set forth in Table 1.

Preparation Example 3

Modified Liquid Polyisoprene (A-3)

To the polymer (A"-1) synthesized in Preparation Example 1, 0.7 molar equivalent of 2-hydroxyethyl acrylate and 0.3 molar equivalent of methanol to the maleic anhydride group having undergone addition were added, and after light shielding, they were allowed to react with the polymer at 120° C. for 10 hours to synthesize modified liquid polyisoprene (A-3) having a modified group (a) containing an acryloyl group as a part thereof and a dicarboxylic acid monomethyl ester group (b). Properties of the resulting modified liquid polyisoprene (A-3) are set forth in Table 1.

Preparation Example 4

Modified Liquid Polyisoprene (A-4)

Isoprene was allowed to undergo anionic polymerization in n-hexane using n-butyllithium as an initiator to obtain polyisoprene having a number-average molecular weight of 8,900 (also referred to as a "polymer (A'-2)" hereinafter). To 100 parts by mass of this polymer (A'-2), 10 parts by mass of maleic anhydride and 1 part by mass of BHT (2,6-di-t-butyl-4-methylphenol, manufactured by Honshu Chemical Industry Co., Ltd.) were added, and maleic anhydride was allowed to react with the polymer at 180° C. for 15 hours to obtain maleic anhydride modified liquid polyisoprene (A"-2) (also referred to as a "polymer (A"-2)" hereinafter). The reaction ratio of the maleic anhydride was not less than 99%, and the amount of maleic anhydride having undergone addition into the polymer (A"-2) was 10 parts by mass based on 100 parts by mass of the polymer (A'-2). Next, to the polymer (A"-2), 0.5 molar equivalent of 2-hydroxyethyl acrylate and 0.5 molar equivalent of methanol to the maleic anhydride group having undergone addition were added, and after light shielding, they were allowed to react with the polymer at 120° C. for 10 hours to synthesize modified liquid polyisoprene (A-4) having a modified group (a) containing an acryloyl group as a part thereof and a dicarboxylic acid monomethyl ester group (b). Properties of the resulting modified liquid polyisoprene (A-4) are set forth in Table 1.

Preparation Example 5

Modified Liquid Polyisoprene (A-5)

To the polymer (A"-1) synthesized in Preparation Example 1, 0.3 molar equivalent of 2-hydroxyethyl methacrylate and 0.7 molar equivalent of methanol to the maleic anhydride group having undergone addition were added, and after light shielding, they were allowed to react with the polymer at 120° C. for 10 hours to synthesize modified liquid polyisoprene (A-5) having a modified group (a) containing a methacryloyl group as apart thereof and a dicarboxylic acid monomethyl ester group (b). Properties of the resulting modified liquid polyisoprene (A-5) are set forth in Table 1.

Preparation Example 6

Modified Liquid Polyisoprene (A-6)

To the polymer (A"-1) synthesized in Preparation Example 1, 0.5 molar equivalent of 2-hydroxyethyl methacrylate and 0.5 molar equivalent of methanol to the maleic anhydride group having undergone addition were added, and after light shielding, they were allowed to react with the polymer at 120° C. for 10 hours to synthesize modified liquid polyisoprene (A-6) having a modified group (a) containing a methacryloyl group as apart thereof and a dicarboxylic acid monomethyl ester group (b). Properties of the resulting modified liquid polyisoprene (A-6) are set forth in Table 1.

Preparation Example 7

Modified Liquid Polyisoprene (A-7)

To the polymer (A"-1) synthesized in Preparation Example 1, 0.3 molar equivalent of 2-hydroxyethylacrylamide and 0.7 molar equivalent of methanol to the maleic anhydride group having undergone addition were added, and after light shielding, they were allowed to react with the polymer at 120° C. for 10 hours to synthesize modified liquid polyisoprene (A-7) having a modified group (a) containing an acrylamide group as a part thereof and a dicarboxylic acid monomethyl ester group (b). Properties of the resulting modified liquid polyisoprene (A-7) are set forth in Table 1.

Preparation Example 8

Modified Liquid Polyisoprene (A-8)

To the polymer (A"-1) synthesized in Preparation Example 1, 0.5 molar equivalent of 2-hydroxyethylacrylamide and 0.5 molar equivalent of methanol to the maleic anhydride group having undergone addition were added, and after light shielding, they were allowed to react with the polymer at 120° C. for 10 hours to synthesize modified liquid polyisoprene (A-8) having a modified group (a) containing an acrylamide group as a part thereof and a dicarboxylic acid monomethyl ester group (b). Properties of the resulting modified liquid polyisoprene (A-8) are set forth in Table 1.

Preparation Example 9

Modified Liquid Polyisoprene (A-9)

To 100 parts by mass of the polymer (A'-1) synthesized in Preparation Example 1, 5 parts by mass of maleic anhydride and 1 part by mass of BHT (2, 6-di-t-butyl-4-methylphenol, manufactured by Honshu Chemical Industry Co., Ltd.) were added, and maleic anhydride was allowed to react with the polymer at 180° C. for 15 hours to obtain maleic anhydride modified liquid polyisoprene (A"-3) (also referred to as a "polymer (A"-3)" hereinafter). The reaction ratio of the maleic anhydride was not less than 99%, and the amount of maleic anhydride having undergone addition into the polymer (A"-3) was 5 parts by mass based on 100 parts by mass of the polymer (A'-1). Next, to the polymer (A"-3), 0.6 molar equivalent of 2-hydroxyethyl methacrylate and 0.4 molar equivalent of methanol to the maleic anhydride group having undergone addition were added, and after light shielding, they were allowed to react with the polymer at 120° C. for 10 hours to synthesize modified liquid polyisoprene (A-9) having a modified group (a) containing a methacryloyl group as apart thereof and a dicarboxylic acid monomethyl ester group (b). Properties of the resulting modified liquid polyisoprene (A-9) are set forth in Table 1.

Preparation Example 10

Modified Liquid Polyisoprene (A-10)

Isoprene was allowed to undergo anionic polymerization in n-hexane using n-butyllithium as an initiator to obtain polyisoprene having a number-average molecular weight of 29,000 (also referred to as a "polymer (A'-3)" hereinafter). To 100 parts by mass of this polymer (A'-3), 5 parts by mass of maleic anhydride and 1 part by mass of BHT (2,6-di-t-butyl-4-methylphenol, manufactured by Honshu Chemical Industry Co., Ltd.) were added, and maleic anhydride was allowed to react with the polymer at 180° C. for 15 hours to obtain maleic anhydride modified liquid polyisoprene (A"-4) (also referred to as a "polymer (A"-4)" hereinafter). The reaction ratio of the maleic anhydride was not less than 99%, and the amount of maleic anhydride having undergone addition into the polymer (A"-4) was 5 parts by mass based on 100 parts by mass of the polymer (A'-3). Next, to the polymer (A"-4), 0.6 molar equivalent of 2-hydroxyethyl methacrylate and 0.4 molar equivalent of methanol to the maleic anhydride group having undergone addition were added, and after light shielding, they were allowed to react with the polymer at 120° C. for 10 hours to synthesize modified liquid polyisoprene (A-10) having a modified group (a) containing a methacryloyl group as a part thereof and a dicarboxylic acid monomethyl ester group (b). Properties of the resulting modified liquid polyisoprene (A-10) are set forth in Table 1.

Preparation Example 11

Modified Liquid Polyisoprene (A-11)

To the polymer (A"-1) synthesized in Preparation Example 1, 0.3 molar equivalent of 2-hydroxyethyl acrylate and 0.7 molar equivalent of dodecyl alcohol (manufactured by Tokyo Chemical Industry Co. Ltd.) to the maleic anhydride group having undergone addition were added, and after light shielding, they were allowed to react with the polymer at 120° C. for 10 hours to synthesize modified liquid polyisoprene (A-11) having a modified group (a) containing an acryloyl group as a part thereof and a dicarboxylic acid monododecyl ester group (b). Properties of the resulting modified liquid polyisoprene (A-11) are set forth in Table 1.

Preparation Example 12

Modified Liquid Polyisoprene (A-12)

To the polymer (A"-3) synthesized in Preparation Example 9, 0.2 molar equivalent of 2-hydroxyethyl methacrylate, 0.2 molar equivalent of 2-hydroxyethyl acrylate, 0.2 molar equivalent of 2-hydroxyethylacrylamide and 0.4 molar equivalent of methanol to the maleic anhydride group having undergone addition were added, and after light shielding, they were allowed to react with the polymer at 120° C. for 10 hours to synthesize modified liquid polyisoprene (A-12) having a modified group (a) containing a methacryloyl group, an acryloyl group and an acrylamide group as a part thereof and a dicarboxylic acid monomethyl ester group (b). Properties of the resulting modified liquid polyisoprene (A-12) are set forth in Table 1.

Preparation Example 13

Modified Liquid Polyisoprene (A-13)

To the polymer (A"-1) synthesized in Preparation Example 1, 0.3 molar equivalent of 2-hydroxyethyl acrylate and 0.7 molar equivalent of 3-methyl-1,3-butanediol (manufactured by Kuraray Co. Ltd.) to the maleic anhydride group having undergone addition were added, and after light shielding, they were allowed to react with the polymer at 120° C. for 10 hours to synthesize modified liquid polyisoprene (A-13) having a modified group (a) containing an acryloyl group as a part thereof and a dicarboxylic acid mono(3-methyl-3-hydroxybutyl) ester group (b). Properties of the resulting modified liquid polyisoprene (A-13) are set forth in Table 1.

Preparation Example 14

Modified Liquid Polyisoprene (A-14)

To the polymer (A"-1) synthesized in Preparation Example 1, 0.3 molar equivalent of 2-hydroxyethyl methacrylate and 0.7 molar equivalent of 3-methyl-1,3-butanediol (manufactured by Kuraray Co. Ltd.) to the maleic anhydride group having undergone addition were added, and after light shielding, they were allowed to react with the polymer at 120° C. for 10 hours to synthesize modified liquid polyisoprene (A-14) having a modified group (a) containing a methacryloyl group as a part thereof and a dicarboxylic acid mono(3-methyl-3-hydroxybutyl) ester group (b). Properties of the resulting modified liquid polyisoprene (A-14) are set forth in Table 1.

Preparation Example 15

Modified Liquid Polyisoprene (A-15)

To the polymer (A"-1) synthesized in Preparation Example 1, 0.15 molar equivalent of 2-hydroxy-3-acryloyloxypropyl methacrylate (manufactured by Shin-Nakamura Chemical Co., Ltd.) and 0.85 molar equivalent of methanol to the maleic anhydride group having undergone addition were added, and after light shielding, they were allowed to react with the polymer at 120° C. for 10 hours to synthesize modified liquid polyisoprene (A-15) having a modified group (a) containing a 2-acryloyl-1-methacryloylmethylethyl group as a part thereof and a dicarboxylic acid monomethyl ester group (b). Properties of the resulting modified liquid polyisoprene (A-15) are set forth in Table 1.

Preparation Example 16

Modified Liquid Polyisoprene (A-16)

To the polymer (A"-1) synthesized in Preparation Example 1, 0.1 molar equivalent of 2-hydroxyethyl acrylate and 0.9 molar equivalent of methanol to the maleic anhydride group having undergone addition were added, and after light shielding, they were allowed to react with the polymer at 120° C. for 10 hours to synthesize modified liquid polyisoprene (A-16) having a modified group (a) containing an acryloyl group as a part thereof and a dicarboxylic acid monomethyl ester group (b). Properties of the resulting modified liquid polyisoprene (A-16) are set forth in Table 1.

Preparation Example 17

Modified Liquid Polyisoprene (A-17)

To the polymer (A"-1) synthesized in Preparation Example 1, 0.2 molar equivalent of 2-hydroxyethyl acrylate and 0.8 molar equivalent of methanol to the maleic anhydride group having undergone addition were added, and after light shielding, they were allowed to react with the polymer at 120° C. for 10 hours to synthesize modified liquid polyisoprene (A-17) having a modified group (a) containing an acryloyl group as apart thereof and a dicarboxylic acid monomethyl ester group (b). Properties of the resulting modified liquid polyisoprene (A-17) are set forth in Table 1.

Preparation Example 18

Modified Liquid Polyisoprene (A-18)

To the polymer (A"-1) synthesized in Preparation Example 1, 0.3 molar equivalent of 2-hydroxyethyl acrylate and 0.7 molar equivalent of 3-methylbutanol to the maleic anhydride group having undergone addition were added, and after light shielding, they were allowed to react with the polymer at 120° C. for 10 hours to synthesize modified liquid polyisoprene (A-18) having a modified group (a) containing an acryloyl group as a part thereof and a dicarboxylic acid mono(3-methylbutyl)ester group (b). Properties of the resulting modified liquid polyisoprene (A-18) are set forth in Table 1.

Preparation Example 19

Modified Liquid Polyisoprene (A-19)

To the polymer (A"-1) synthesized in Preparation Example 1, 0.3 molar equivalent of 2-hydroxyethyl acrylate and 0.7 molar equivalent of 2,2,2-trifluoroethanol to the maleic anhydride group having undergone addition were added, and after light shielding, they were allowed to react with the polymer at 120° C. for 10 hours to synthesize modified liquid polyisoprene (A-19) having a modified group (a) containing a 2-acryloyl-1-methacryloylmethylethyl group as a part thereof and a dicarboxylic acid mono (2,2,2-trifluoroethyl) ester group (b). Properties of the resulting modified liquid polyisoprene (A-19) are set forth in Table 1.

Preparation Example 20

Modified Liquid Polyisoprene (A-20)

To 100 parts by mass of the polymer (A'-1) synthesized in Preparation Example 1, 1 part by mass of maleic anhydride and 0.1 part by mass of BHT were added, and maleic anhydride was allowed to react with the polymer at 180° C. for 15 hours to obtain maleic anhydride modified liquid polyisoprene (A"-5) (also referred to as a "polymer (A"-5)" hereinafter). The reaction ratio of the maleic anhydride was not less than 99%, and the amount of maleic anhydride having undergone addition into the polymer (A"-5) was 1 part by mass based on 100 parts by mass of the polymer (A'-1). Next, to the polymer (A"-5), 1.05 molar equivalents of 2-hydroxyethyl methacrylate to the maleic anhydride group having undergone addition were added, and after light shielding, 2-hydroxyethyl methacrylate was allowed to react with the polymer at 120° C. for 10 hours to synthesize modified liquid polyisoprene (A-20) having a modified group (a) containing a methacryloyl group as a part thereof. Properties of the resulting modified liquid polyisoprene (A-20) are set forth in Table 1.

Preparation Example 21

Modified Liquid Polyisoprene (A-21)

To the polymer (A"-1) synthesized in Preparation Example 1, 0.98 molar equivalent of 2-hydroxyethyl methacrylate and 0.02 molar equivalent of methanol to the maleic anhydride group having undergone addition were added, and after light shielding, they were allowed to react with the polymer at 120° C. for 10 hours to synthesize modified liquid polyisoprene (A-21) having a modified group (a) containing a methacryloyl group as a part thereof and a dicarboxylic acid monomethyl ester group (b). Properties of the resulting modified liquid polyisoprene (A-21) are set forth in Table 1.

Preparation Example 22

Modified Liquid Polyisoprene (A-22)

To the polymer (A"-1) synthesized in Preparation Example 1, 0.02 molar equivalent of 2-hydroxyethyl methacrylate and 0.98 molar equivalent of methanol to the maleic anhydride group having undergone addition were added, and after light shielding, they were allowed to react with the polymer at 120° C. for 10 hours to synthesize modified liquid polyisoprene (A-22) having a modified group (a) containing a methacryloyl group as a part thereof and a dicarboxylic acid monomethyl ester group (b). Properties of the resulting modified liquid polyisoprene (A-22) are set forth in Table 1.

Measuring methods for various property values of the modified liquid polyisoprenes (A-1) to (A-22) obtained in the preparation examples are as follows.

(Measuring Method for Number-Average Molecular Weight (Mn))

Mn of the modified liquid polyisoprene obtained in each preparation example was determined as a molecular weight in terms of standard polystyrene by the use of GPC (gel permeation chromatography). The measuring apparatus and the conditions are as follows.

Apparatus: GPC apparatus "GPC8020" manufactured by Tosoh Corporation
Separation column: "TSKgelG4000HXL" manufactured by Tosoh Corporation
Detector: "RI-8020" manufactured by Tosoh Corporation
Eluent: tetrahydrofuran
Eluent flow rate: 1.0 ml/min
Sample concentration: 5 mg/10 ml
Column temperature: 40° C.

(Reaction Ratio of Maleic Anhydride)

To 3 g of a sample after modification reaction were added 180 mL of toluene and 20 mL of ethanol to dissolve the sample, and thereafter, the resulting solution was subjected to neutralization titration with an ethanol solution of 0.1N potassium hydroxide to determine an acid value.

$$\text{Acid value (mgKOH/g)}=(A-B)\times F\times 5.611/S$$

A: amount (mL) of dropped ethanol solution of 0.1N potassium hydroxide required for neutralization
B: amount (mL) of dropped ethanol solution of 0.1N potassium hydroxide as a blank containing no sample
F: titer of ethanol solution of 0.1N potassium hydroxide
S: mass (g) of sample weighed Further, the sample after modification reaction was washed four times with methanol (5 mL based on 1 g of sample) to remove unreacted maleic anhydride, thereafter the sample was vacuum dried at 80° C. for 12 hours, and an acid value was determined in the same manner as above. The reaction ratio of the maleic anhydride was calculated from the following formula.

[Reaction ratio (%) of maleic anhydride]=[acid value after washing]/[acid value before washing]×100

(Amount of Maleic Anhydride Having Undergone Addition)

Using the reaction ratio determined above, the amount of maleic anhydride having undergone addition to the unmodified liquid polyisoprene was calculated from the following formula.

[Amount of Maleic Anhydride Having Undergone Addition to 100 parts by mass of unmodified liquid polyisoprene]=[mass (g) of maleic anhydride added]×[reaction ratio (%) of maleic anhydride]/[mass (g) of unmodified liquid polyisoprene]

(Functional Group Equivalent Weight)

Using $^1$H-NMR (500 MHz) manufactured by JEOL Ltd., the functional group equivalent weight was measured under the conditions of a concentration of sample/deuterated chloroform=100 mg/1 mL, a cumulative number of times of 512 and a measuring temperature of 50° C.

With regard to the modified group (a), the functional group equivalent weight of the modified group (a) was calculated from an area ratio between a peak derived from a double bond of a (meth)acryloyl group possessed by the modified group (a) and a peak derived from a carbon-carbon double bond of the polymer main chain in the resulting spectrum.

With regard to the modified group (b), the functional group equivalent weight of the modified group (b) to the polymer weight was calculated from an area ratio between a peak derived from a methylene group adjacent to an oxygen atom of the modified group (b) and a peak derived from a carbon-carbon double bond of the polymer main chain in the resulting spectrum.

(Measuring Method for Glass Transition Temperature)

In an aluminum pan, 10 mg of the modified liquid polyisoprene obtained in each preparation example was placed, then a thermogram was measured by differential scanning calorimetry (DSC) under the heating rate condition of 10° C./min, and the value at the peak top of DSC was taken as a glass transition temperature.

(Measuring Method for Melt Viscosity)

Melt viscosity of the modified liquid polyisoprene obtained in each preparation example was measured at 38° C. by a Brookfield type viscometer (manufactured by BROOKFIELD ENGINEERING LABS. INC.).

(Compatibility with Polar Monomer)

To 5 g of the modified liquid polyisoprene obtained in each preparation example, an arbitrary amount of 2-hydroxyethyl methacrylate (HEMA) was added as a polar monomer, and they were sufficiently stirred at 50° C. to make the mixture homogeneous, then the mixture was allowed to stand for 3 hour at room temperature, and a change in appearance was observed. When the mixture was transparent without causing separation and cloudiness, it was judged that the components were compatible with each other, and the maximum amount (part(s) by mass) of HEMA compatible with 100 parts by mass of the modified liquid polyisoprene was measured.

TABLE 1

| | Modified liquid isoprene rubber | | | | | | | |
|---|---|---|---|---|---|---|---|---|
| | A-1 | A-2 | A-3 | A-4 | A-5 | A-6 | A-7 | A-8 |
| Mn (PSt Std.) | 22,300 | 24,100 | 22,100 | 9,600 | 21,900 | 21,900 | 21,300 | 21,600 |
| Type of (meth)acryloyl group/acrylamide group possessed by modified group (a) | acryloyl | acryloyl | acryloyl | acryloyl | methacryloyl | methacryloyl | acrylamide | acrylamide |
| Functional group equivalent weight of modified group (a) (g/eq) | 3300 | 2000 | 1200 | 2000 | 3100 | 2200 | 3300 | 2100 |
| Type of monoester/monoamide possessed by modified group (b) | methyl ester | methyl ester | methyl ester | methyl ester | methyl ester | methyl ester | methyl ester | methyl ester |
| Functional group equivalent weight of modified group (b) (g/eq) | 1700 | 2800 | 6100 | 2300 | 1800 | 2600 | 1300 | 1500 |
| Glass transition temperature (° C.) | −58 | −58 | −58 | −59 | −58 | −58 | −57 | −57 |
| Melt viscosity (38° C.) (Pa·s) | 270 | 244 | 188 | 28 | 250 | 140 | 410 | 874 |
| Amount of HEMA compatible with 100 parts by mass of modified liquid isoprene rubber (part(s) by mass) | 50 | 45 | 40 | 45 | 50 | 45 | 50 | 45 |

| | Modified liquid isoprene rubber | | | | | | | |
|---|---|---|---|---|---|---|---|---|
| | A-9 | A-10 | A-11 | A-12 | A-13 | A-14 | A-15 | A-16 |
| Mn (PSt Std.) | 20,900 | 29,800 | 22,000 | 20,900 | 24,900 | 23,900 | 24,600 | 22,600 |
| Type of (meth)acryloyl group/acrylamide group possessed by modified group (a) | methacryloyl | methacryloyl | acryloyl | methacryloyl acryloyl acrylamide | acryloyl | methacryloyl | 2 acryloyl 1-methacryloyl methylethyl | acryloyl |
| Functional group equivalent weight of modified group (a) (g/eq) | 3400 | 3400 | 3300 | 3100 | 3300 | 4300 | 6600 | 8200 |
| Type of monoester/monoamide possessed by modified group (b) | methyl ester | methyl ester | dodecyl ester | methyl ester | 3-hydroxy-3-methylbutyl ester | 3-hydroxy-3-methylbutyl ester | methyl ester | methyl ester |
| Functional group equivalent weight of modified group (b) (g/eq) | 5900 | 6400 | 1600 | 6200 | 2000 | 1800 | 1400 | 1200 |
| Glass transition temperature (° C.) | −59 | −59 | −59 | −58 | −55 | −55 | −56 | −58 |
| Melt viscosity (38° C.) (Pa·s) | 52 | 260 | 211 | 82 | 844 | 691 | 414 | 349 |
| Amount of HEMA compatible with 100 parts by mass of modified liquid isoprene rubber (part(s) by mass) | 10 | 10 | 40 | 10 | 85 | 85 | 50 | 50 |

| | Modified liquid isoprene rubber | | | | | |
|---|---|---|---|---|---|---|
| | A-17 | A-18 | A-19 | A-20 | A-21 | A-22 |
| Mn (PSt Std.) | 23,000 | 24,300 | 24,400 | 20,300 | 22,000 | 22,100 |
| Type of (meth)acryloyl group/acrylamide group possessed by modified group (a) | acryloyl | acryloyl | acryloyl | methacryloyl | methacryloyl | methacryloyl |
| Functional group equivalent weight of modified group (a) (g/eq) | 4500 | 3000 | 300 | 9100 | 1000 | 54000 |
| Type of monoester/monoamide possessed by modified group (b) | methyl ester | 3-methyl-butyl ester | 2,2,2-trifluoro-ester | — | methyl ester | methyl ester |
| Functional group equivalent weight of modified group (b) (g/eq) | 1400 | 1800 | 1800 | — | 51000 | 1100 |

TABLE 1-continued

| | | | | | | |
|---|---|---|---|---|---|---|
| Glass transition temperature (° C.) | −58 | −58 | −58 | −60 | −58 | −58 |
| Melt viscosity (38° C.) (Pa · s) | 337 | 273 | 340 | 22 | 130 | 255 |
| Amount of HEMA compatible with 100 parts by mass of modified liquid isoprene rubber (part(s) by mass) | 50 | 40 | 45 | 2 | 40 | 50 |

From Table 1, it can be seen that in the case of the modified liquid polyisoprene (A-20) having no modified group (b), the amount of HEMA compatible with the polyisoprene is small, and the compatibility of the polyisoprene with a polar monomer is extremely low. On the other hand, it can be seen that in the case of the modified liquid polyisoprenes (A-1) to (A-19) having the modified group (a) and the modified group (b) in specific ranges, the amount of HEMA compatible with the polyisoprenes is larger as compared with (A-20), and any of the polyisoprenes exhibits good compatibility with a polar monomer.

Examples 1 to 15

In a 300 mL stainless steel container, the modified liquid polyisoprenes (A-1) to (A-15) and the radical polymerization initiator (B-1) were placed in proportions shown in Table 2, and they were mixed for 20 minutes at room temperature using a stirrer to prepare resin compositions each being in an amount of 200 g. The resulting resin compositions were evaluated by the following methods. The results are set forth in Table 2.

Comparative Examples 1 to 3

Resin compositions were prepared in the same manner as in Example 1, except that the modified liquid polyisoprenes (A-20) to (A-22) and the radical polymerization initiator (B-1) were compounded in proportions shown in Table 2. Then, the resin compositions were evaluated. The results are set forth in Table 2.

Examples 16 to 36

Resin compositions were prepared in the same manner as in Example 1, except that the modified liquid polyisoprenes (A-1) to (A-19), the radical polymerization initiator (B-1) and the radical-polymerizable monomers (C-1) and (C-2) each having a carbon-carbon double bond were compounded in proportions shown in Table 3. Then, the resin compositions were evaluated. The results are set forth in Table 3.

Comparative Examples 4 to 6

Resin compositions were prepared in the same manner as in Example 1, except that the modified liquid polyisoprenes (A-20) to (A-22), the radical polymerization initiator (B-1) and the radical-polymerizable monomers (C-1) and (C-2) each having a carbon-carbon double bond were compounded in proportions shown in Table 3. Then, the resin compositions were evaluated. The results are set forth in Table 3.

The evaluation methods for properties are as follows.

(Appearance)

The resin composition obtained in each of the examples and the comparative examples was injected into a mold having a length of 70 mm, a width of 70 mm and a thickness of 0.5 mm, and the surface of the composition was covered with a PET film having a thickness of 50 μm. Thereafter, using an UV irradiation apparatus (manufactured by GS Yuasa Corporation, HAK125L-F was used as a mercury lamp), UV irradiation was carried out under the conditions of an illuminance of 45 mW/cm$^2$, a conveyer velocity of 0.25 m/min and an irradiation dose of 1,000 mJ/cm$^2$ (per operation). This operation was repeated three times to obtain a cured product. From the cured product, the PET film was peeled off, then the cured product was visually observed, and transparency was evaluated according to the following criteria.

<Evaluation Criteria>
5: The cured product is colorless and transparent.
4: The cured product is transparent though very slight coloring is observed.
3: The cured product is transparent though slight coloring is observed.
2: The cured product is transparent though apparent coloring is observed.
1: The cured product is opaque.

(Hardness)

The resin composition obtained in each of the examples and the comparative examples was injected into a mold having a length of 70 mm, a width of 35 mm and a thickness of 2.0 mm, and the surface of the composition was covered with a PET film having a thickness of 50 μm. Thereafter, using an UV irradiation apparatus (manufactured by GS Yuasa Corporation, HAK125L-F was used as a mercury lamp), UV irradiation was carried out under the conditions of an illuminance of 45 mW/cm$^2$, a conveyer velocity of 0.25 m/min and an irradiation dose of 1,000 mJ/cm$^2$ (per operation). This operation was repeated three times to obtain a cured product. Three of the resulting 2.00 mm films were superposed one upon another to obtain a sample of 6.0 mm, and the hardness of the sample was measured in accordance with JIS K 6253.

(Breaking Strength, Tensile Elongation and Elastic Modulus)

From the cured product obtained in the above appearance observation, a strip sample having a width of 6 mm and a length of 70 mm was punched out, and the sample was subjected to a tensile test at a pulling rate of 50 mm/min to measure a breaking strength, a tensile elongation and an elastic modulus by the use of an Instron tensile tester.

(UV Irradiation Dose Required for Curing)

The resin composition obtained in each of the examples and the comparative examples was injected into a mold having a length of 70 mm, a width of 70 mm and a thickness of 0.5 mm, and the surface of the composition was covered with a PET film having a thickness of 50 μm to prepare six samples for curing.

Thereafter, using an UV irradiation apparatus (manufactured by GS Yuasa Corporation, HAK125L-F was used as a mercury lamp), UV irradiation was carried out under the conditions of an illuminance of 30 mW/cm$^2$ and a conveyer velocity of 2 m/min (UV irradiation dose per operation: 150 mJ/cm$^2$). That is to say, the above six samples for curing were subjected to UV irradiation operation under the above conditions once (total of UV irradiation dose: 150 mJ/cm$^2$), twice (total of UV irradiation dose: 300 mJ/cm²), 4 times (total of UV irradiation dose: 600 mJ/cm²), 6 times (total of UV irradiation dose: 900 mJ/cm²), 8 times (total of UV irradiation dose: 1,200 J/cm²) and 16 times (total of UV irradiation dose: 2,400 mJ/cm²), respectively, to prepare six cured product samples. From each of the cured product samples, the PET film was peeled off, and each cured product obtained was weighed. Thereafter, the cured product was immersed in toluene for 24 hours at room temperature, and the insoluble part was filtered off using a 200-mesh wire netting, washed and then vacuum dried at 80° C. for 12 hours. After the drying, the toluene-insoluble part was weighed. Using the results, a gel fraction of the sample at each UV irradiation dose was calculated from the following formula.

Gel fraction (%)=(mass of toluene-insoluble part)/(mass of cured product before immersion in toluene)×100

From a relationship between the gel fraction obtained in this test and the UV irradiation dose, an UV irradiation dose at which a gel fraction of 80% was reached was roughly estimated, and the resulting value was taken as an UV irradiation dose required for curing.

(Melt Viscosity)

Melt viscosity of the resin composition obtained in each of Examples 16 to 36 and Comparative Examples 4 to 6 was measured at 38° C. by the use of a Brookfield type viscometer (manufactured by BROOKFIELD ENGINEERING LABS. INC.).

TABLE 2

|  |  |  | Example | | | | | | | | |
|---|---|---|---|---|---|---|---|---|---|---|---|
|  |  |  | 1 | 2 | 3 | 4 | 5 | 6 | 7 | 8 | 9 |
| Compounding (part(s) by mass) | Component (A) | (A-1) | 100 | | | | | | | | |
|  |  | (A-2) |  | 100 | | | | | | | |
|  |  | (A-3) |  |  | 100 | | | | | | |
|  |  | (A-4) |  |  |  | 100 | | | | | |
|  |  | (A-5) |  |  |  |  | 100 | | | | |
|  |  | (A-6) |  |  |  |  |  | 100 | | | |
|  |  | (A-7) |  |  |  |  |  |  | 100 | | |
|  |  | (A-8) |  |  |  |  |  |  |  | 100 | |
|  |  | (A-9) |  |  |  |  |  |  |  |  | 100 |
|  |  | (A-10) |  |  |  |  |  |  |  |  |  |
|  |  | (A-11) |  |  |  |  |  |  |  |  |  |
|  |  | (A-12) |  |  |  |  |  |  |  |  |  |
|  |  | (A-13) |  |  |  |  |  |  |  |  |  |
|  |  | (A-14) |  |  |  |  |  |  |  |  |  |
|  |  | (A-15) |  |  |  |  |  |  |  |  |  |
|  |  | (A-20) |  |  |  |  |  |  |  |  |  |
|  |  | (A-21) |  |  |  |  |  |  |  |  |  |
|  |  | (A-22) |  |  |  |  |  |  |  |  |  |
|  | Component (B) | (B-1) | 3 | 3 | 3 | 3 | 3 | 3 | 3 | 3 | 3 |
| [B] × 100/(total amount of composition) [% by mass] |  |  | 2.9 | 2.9 | 2.9 | 2.9 | 2.9 | 2.9 | 2.9 | 2.9 | 2.9 |
| Evaluation | Appearance |  | 5 | 5 | 5 | 5 | 5 | 5 | 5 | 5 | 5 |
|  | Hardness (JIS A) |  | 23 | 47 | 62 | 29 | 31 | 48 | 30 | 56 | 32 |
|  | Tensile elongation (%) |  | 79 | 39 | 22 | 33 | 62 | 44 | 83 | 43 | 43 |
|  | Breaking strength (MPa) |  | 0.5 | 0.6 | 1.1 | 0.2 | 0.5 | 0.7 | 0.5 | 0.9 | 0.3 |
|  | Elastic modulus E' (MPa) |  | 0.8 | 1.6 | 6.2 | 0.8 | 0.8 | 1.5 | 0.7 | 2.2 | 0.9 |
|  | UV irradiation dose required for curing (mJ/cm2) |  | 1420 | 1130 | 730 | 1550 | 1190 | 870 | 1320 | 1000 | 1100 |

|  |  |  | Example | | | | | | Comparative Example | | |
|---|---|---|---|---|---|---|---|---|---|---|---|
|  |  |  | 10 | 11 | 12 | 13 | 14 | 15 | 1 | 2 | 3 |
| Compounding (part(s) by mass) | Component (A) | (A-1) |  |  |  |  |  |  |  |  |  |
|  |  | (A-2) |  |  |  |  |  |  |  |  |  |
|  |  | (A-3) |  |  |  |  |  |  |  |  |  |
|  |  | (A-4) |  |  |  |  |  |  |  |  |  |
|  |  | (A-5) |  |  |  |  |  |  |  |  |  |
|  |  | (A-6) |  |  |  |  |  |  |  |  |  |
|  |  | (A-7) |  |  |  |  |  |  |  |  |  |
|  |  | (A-8) |  |  |  |  |  |  |  |  |  |
|  |  | (A-9) |  |  |  |  |  |  |  |  |  |
|  |  | (A-10) | 100 | | | | | | | | |
|  |  | (A-11) |  | 100 | | | | | | | |
|  |  | (A-12) |  |  | 100 | | | | | | |
|  |  | (A-13) |  |  |  | 100 | | | | | |
|  |  | (A-14) |  |  |  |  | 100 | | | | |
|  |  | (A-15) |  |  |  |  |  | 100 | | | |
|  |  | (A-20) |  |  |  |  |  |  | 100 | | |
|  |  | (A-21) |  |  |  |  |  |  |  | 100 | |
|  |  | (A-22) |  |  |  |  |  |  |  |  | 100 |
|  | Component (B) | (B-1) | 3 | 3 | 3 | 3 | 3 | 3 | 3 | 3 | 3 |
| [B] × 100/(total amount of composition) [% by mass] |  |  | 2.9 | 2.9 | 2.9 | 2.9 | 2.9 | 2.9 | 2.9 | 2.9 | 2.9 |

TABLE 2-continued

| Evaluation | Appearance | 5 | 5 | 5 | 5 | 5 | 5 | 5 | 5 | 5 |
|---|---|---|---|---|---|---|---|---|---|---|
| | Hardness (JIS A) | 42 | 25 | 36 | 34 | 38 | 5 | <5 | 75 | unmeasurable |
| | Tensile elongation (%) | 44 | 59 | 54 | 76 | 65 | 85 | 45 | 18 | unmeasurable |
| | Breaking strength (MPa) | 0.6 | 0.3 | 0.4 | 0.5 | 0.4 | 0.3 | <0.1 | 1.6 | unmeasurable |
| | Elastic modulus E' (MPa) | 1.7 | 0.7 | 1.0 | 0.9 | 1.1 | 0.5 | <0.1 | 8.4 | unmeasurable |
| | UV irradiation dose required for curing (mJ/cm2) | 530 | 1410 | 980 | 1130 | 990 | 1700 | 3000< | 740 | 3000< |

TABLE 3

| | | | Example | | | | | | | |
|---|---|---|---|---|---|---|---|---|---|---|
| | | | 16 | 17 | 18 | 19 | 20 | 21 | 22 | 23 |
| Compounding (part(s) by mass) | Component (A) | (A-1) | 50 | | | | | | | |
| | | (A-2) | | 50 | | | | | | |
| | | (A-3) | | | 50 | | | | | |
| | | (A-4) | | | | 50 | | | | |
| | | (A-5) | | | | | 50 | | | |
| | | (A-6) | | | | | | 50 | 50 | |
| | | (A-7) | | | | | | | | 50 |
| | | (A-8) | | | | | | | | |
| | | (A-9) | | | | | | | | |
| | | (A-10) | | | | | | | | |
| | | (A-11) | | | | | | | | |
| | | (A-12) | | | | | | | | |
| | | (A-13) | | | | | | | | |
| | | (A-14) | | | | | | | | |
| | | (A-15) | | | | | | | | |
| | | (A-16) | | | | | | | | |
| | | (A-17) | | | | | | | | |
| | | (A-18) | | | | | | | | |
| | | (A-19) | | | | | | | | |
| | | (A-20) | | | | | | | | |
| | | (A-21) | | | | | | | | |
| | | (A-22) | | | | | | | | |
| | Component (B) | (B-1) | 3 | 3 | 3 | 3 | 3 | 3 | 3 | 3 |
| | Component (C) | FA-512M | 50 | 50 | 50 | 50 | 50 | 50 | | 50 |
| | | IBXA | | | | | | | 50 | |
| | Mass ratio [A]/[C] | | 1 | 1 | 1 | 1 | 1 | 1 | 1 | 1 |
| | [B] × 100/(total amount of composition) [% by mass] | | 2.9 | 2.9 | 2.9 | 2.9 | 2.9 | 2.9 | 2.9 | 2.9 |
| Evaluation | Melt viscosity at 38° C. (Pa · s) | | 2.4 | 2.6 | 2.2 | 0.6 | 2.3 | 1.9 | 1.6 | 2.7 |
| | Appearance | | 5 | 5 | 5 | 5 | 5 | 5 | 5 | 5 |
| | Hardness (JIS A) | | 28 | 40 | 52 | 29 | 30 | 37 | 60 | 37 |
| | Tensile elongation (%) | | 247 | 151 | 100 | 136 | 149 | 127 | 101 | 213 |
| | Breaking strength (MPa) | | 2.2 | 2.3 | 2.8 | 1.2 | 1.2 | 2.0 | 5.4 | 3.3 |
| | Elastic modulus E' (MPa) | | 1.2 | 1.1 | 2.5 | 0.8 | 0.8 | 1.6 | 4.0 | 1.5 |
| | UV irradiation dose required for curing (mJ/cm2) | | 1100 | 680 | 680 | 1200 | 770 | 520 | 1020 | 1200 |

| | | | Example | | | | | | | |
|---|---|---|---|---|---|---|---|---|---|---|
| | | | 24 | 25 | 26 | 27 | 28 | 29 | 30 | 31 |
| Compounding (part(s) by mass) | Component (A) | (A-1) | | | | | | | | |
| | | (A-2) | | | | | | | | |
| | | (A-3) | | | | | | | | |
| | | (A-4) | | | | | | | | |
| | | (A-5) | | | | | | | | |
| | | (A-6) | | | | | | | | |
| | | (A-7) | | | | | | | | |
| | | (A-8) | 50 | | | | | | | |
| | | (A-9) | | 50 | | | | | | |
| | | (A-10) | | | 50 | | | | | |
| | | (A-11) | | | | 50 | | | | |
| | | (A-12) | | | | | 50 | | | |
| | | (A-13) | | | | | | 50 | | |
| | | (A-14) | | | | | | | 50 | |
| | | (A-15) | | | | | | | | 50 |
| | | (A-16) | | | | | | | | |
| | | (A-17) | | | | | | | | |
| | | (A-18) | | | | | | | | |
| | | (A-19) | | | | | | | | |
| | | (A-20) | | | | | | | | |
| | | (A-21) | | | | | | | | |
| | | (A-22) | | | | | | | | |

TABLE 3-continued

|  |  |  |  |  |  |  |  |  |  |
|---|---|---|---|---|---|---|---|---|---|
| | Component (B) | (B-1) | 3 | 3 | 3 | 3 | 3 | 3 | 3 | 3 |
| | Component (C) | FA-512M | 50 | 50 | 50 | 50 | 50 | 50 | 50 | 50 |
| | | IBXA | | | | | | | | |
| | Mass ratio [A]/[C] | | 1 | 1 | 1 | 1 | 1 | 1 | 1 | 1 |
| | [B] × 100/(total amount of composition) [% by mass] | | 2.9 | 2.9 | 2.9 | 2.9 | 2.9 | 2.9 | 2.9 | 2.9 |
| Evaluation | Melt viscosity at 38° C. (Pa · s) | | 3.5 | 1.2 | 3.5 | 2.3 | 1.5 | 3.3 | 3.1 | 2.6 |
| | Appearance | | 5 | 5 | 5 | 5 | 5 | 5 | 5 | 5 |
| | Hardness (JIS A) | | 52 | 37 | 37 | 39 | 43 | 49 | 49 | 37 |
| | Tensile elongation (%) | | 131 | 199 | 207 | 249 | 226 | 222 | 146 | 163 |
| | Breaking strength (MPa) | | 3.3 | 2.6 | 3.4 | 3.3 | 3.2 | 4.7 | 2.4 | 1.5 |
| | Elastic modulus E' (MPa) | | 3.1 | 3.9 | 1.7 | 2.3 | 2.6 | 2.0 | 1.3 | 0.9 |
| | UV irradiation dose required for curing (mJ/cm2) | | 600 | 810 | 530 | 1220 | 870 | 1220 | 740 | 1040 |

|  |  |  | Example | | | | |
|---|---|---|---|---|---|---|---|
| | | | 32 | 33 | 34 | 35 | 36 |
| Compounding (part(s) by mass) | Component (A) | (A-1) | 90 | | | | |
| | | (A-2) | | | | | |
| | | (A-3) | | | | | |
| | | (A-4) | | | | | |
| | | (A-5) | | | | | |
| | | (A-6) | | | | | |
| | | (A-7) | | | | | |
| | | (A-8) | | | | | |
| | | (A-9) | | | | | |
| | | (A-10) | | | | | |
| | | (A-11) | | | | | |
| | | (A-12) | | | | | |
| | | (A-13) | | | | | |
| | | (A-14) | | | | | |
| | | (A-15) | | | | | |
| | | (A-16) | | 90 | | | |
| | | (A-17) | | | 90 | | |
| | | (A-18) | | | | 90 | |
| | | (A-19) | | | | | 90 |
| | | (A-20) | | | | | |
| | | (A-21) | | | | | |
| | | (A-22) | | | | | |
| | Component (B) | (B-1) | 3 | 3 | 3 | 3 | 3 |
| | Component (C) | FA-512M | 10 | 10 | 10 | 10 | 10 |
| | | IBXA | | | | | |
| | Mass ratio [A]/[C] | | 9 | 9 | 9 | 9 | 9 |
| | [B] × 100/(total amount of composition) [% by mass] | | 2.9 | 2.9 | 2.9 | 2.9 | 2.9 |
| Evaluation | Melt viscosity at 38° C. (Pa · s) | | 241 | 243 | 236 | 218 | 245 |
| | Appearance | | 5 | 5 | 5 | 5 | 5 |
| | Hardness (JIS A) | | 25 | <5 | 9 | 25 | 25 |
| | Tensile elongation (%) | | 79 | 454 | 134 | 54 | 72 |
| | Breaking strength (MPa) | | 0.4 | 0.1 | 0.2 | 0.4 | 0.5 |
| | Elastic modulus E' (MPa) | | 0.6 | <0.1 | 0.2 | 0.9 | 0.9 |
| | UV irradiation dose required for curing (mJ/cm2) | | 1300 | 4000 | 2900 | 1300 | 1450 |

|  |  |  | Comparative Example | | |
|---|---|---|---|---|---|
| | | | 4 | 5 | 6 |
| Compounding (part(s) by mass) | Component (A) | (A-1) | | | |
| | | (A-2) | | | |
| | | (A-3) | | | |
| | | (A-4) | | | |
| | | (A-5) | | | |
| | | (A-6) | | | |
| | | (A-7) | | | |
| | | (A-8) | | | |
| | | (A-9) | | | |
| | | (A-10) | | | |
| | | (A-11) | | | |
| | | (A-12) | | | |
| | | (A-13) | | | |
| | | (A-14) | | | |
| | | (A-15) | | | |
| | | (A-16) | | | |
| | | (A-17) | | | |
| | | (A-18) | | | |
| | | (A-19) | | | |
| | | (A-20) | 50 | | |

TABLE 3-continued

|   |   |   |   |   |   |
|---|---|---|---|---|---|
|  | (A-21) |  |  | 50 |  |
|  | (A-22) |  |  |  | 50 |
| Component (B) | (B-1) | 3 | 3 | 3 |  |
| Component (C) | FA-512M | 50 | 50 | 50 |  |
|  | IBXA |  |  |  |  |
| Mass ratio [A]/[C] |  | 1 | 1 | 1 |  |
| [B] × 100/(total amount of composition) [% by mass] |  | 2.9 | 2.9 | 2.9 |  |
| Evaluation | Melt viscosity at 38° C. (Pa · s) | 0.6 | 1.8 | 3.4 |  |
|  | Appearance | 5 | 5 | 5 |  |
|  | Hardness (JIS A) | 30 | 60 | 25 |  |
|  | Tensile elongation (%) | 120 | 81 | 197 |  |
|  | Breaking strength (MPa) | 1.0 | 3.5 | 0.9 |  |
|  | Elastic modulus E' (MPa) | 0.7 | 5.1 | 0.6 |  |
|  | UV irradiation dose required for curing (mJ/cm2) | 1650 | 660 | 1700 |  |

From Table 2 and Table 3, it can be seen that the curable resin compositions of Examples 1 to 36 using the modified liquid polyisoprenes (A-1) to (A-19) that are each within the range determined by the present invention need small UV irradiation dose for curing and have a satisfactory curing rate, and after curing, they become films having not only good transparency and strength but also low hardness, low elastic modulus, high tensile elongation and high flexibility.

On the other hand, it can be seen that as shown in Comparative Examples 3 and 6, in the resin compositions using the modified liquid polyisoprene (A-22) in which the functional group equivalent weight of the modified group (a) is out of the range determined by the present invention, the polyisoprene (A-22) has equal compatibility with the polar monomer to that of modified liquid polyisoprenes (A-1) to (A-19) that are each within the range determined by the present invention, but because of a low content of the modified group (a) containing a (meth)acryloyl group as a part thereof, the resin compositions have an extremely low curing rate, and even if they are irradiated with UV of 3,000 mJ/cm², they are not cured completely, or curing takes an extremely long time. Further, it can be seen that as shown in Comparative Examples 2 and 5, the modified liquid polyisoprene (A-21) in which the functional group equivalent weight of the modified group (b) is out of the range determined by the present invention has equal compatibility with the polar monomer to that of the modified liquid polyisoprenes (A-1) to (A-19) that are each within the range determined by the present invention, and the curing rate of the resin compositions is also equal to that of Examples 1 to 36, but the content of at least one modified group (b) selected from a dicarboxylic acid monoester and a dicarboxylic acid monoamide is low, and as compared with this, only the content of the modified group (a) is so high that the molecular weight between crosslinking points after crosslinking reaction is lowered, and therefore, after curing, the compositions become films having high hardness, high elastic modulus, low tensile elongation and insufficient flexibility.

Examples 37 to 55

The modified liquid diene-based rubbers (A-1) to (A-19), the radical polymerization initiator (B-1) and the radical-polymerizable monomer (C-1) having a carbon-carbon double bond were compounded in proportions shown in Table 4 to prepare compositions. The resulting each composition was uniformly applied in a thickness of 100 μm to a glass plate, and using an UV irradiation apparatus (manufactured by GS Yuasa Corporation, HAK125L-F was used as a mercury lamp), UV irradiation was carried out under the conditions of an illuminance of 45 mW/cm², a conveyer velocity of 0.25 m/min and an irradiation dose of 1,000 mJ/cm² (per operation). This operation was repeated three times to obtain an evaluation sample in which a cured coating film had been formed on the glass plate. The adhesion of the cured coating film to the glass plate was examined in accordance with JIS K 5600-5-6 (cross-cut method). In this test to examine adhesion, the total number of squares was 100 (lengthwise 10 squares×lateral 10 squares), and based on the number of squares remaining without peeling or breakage among 100 squares, adhesion of the cured product obtained from the composition containing the modified liquid diene-based rubber to the glass plate was evaluated according to five grades.

5: 90 or more squares remain.
4: 70 or more but 89 or fewer squares remain.
3: 50 or more but 69 or fewer squares remain.
2: 30 or more but 49 or fewer squares remain.
1: 29 or fewer squares remain.

Comparative Examples 7 to 9

Resin compositions were prepared in the same manner as in Example 30, except that the modified liquid diene-based rubbers (A-20) to (A-22), the radical polymerization initiator (B-1) and the radical-polymerizable monomer (C-1) having a carbon-carbon double bond were compounded in proportions shown in Table 4. Then, evaluation was carried out. The results are set forth in Table 4.

TABLE 4

|  |  |  | Example |  |  |  |  |  |  |  |  |  |  |
|---|---|---|---|---|---|---|---|---|---|---|---|---|---|
|  |  |  | 37 | 38 | 39 | 40 | 41 | 42 | 43 | 44 | 45 | 46 | 47 |
| Compounding (part(s) by mass) | Component (A) | (A-1) | 90 |  |  |  |  |  |  |  |  |  |  |
|  |  | (A-2) |  | 90 |  |  |  |  |  |  |  |  |  |
|  |  | (A-3) |  |  | 90 |  |  |  |  |  |  |  |  |
|  |  | (A-4) |  |  |  | 90 |  |  |  |  |  |  |  |

TABLE 4-continued

| | | | | | | | | | | | | |
|---|---|---|---|---|---|---|---|---|---|---|---|---|
| | (A-5) | | | 90 | | | | | | | | |
| | (A-6) | | | | 90 | | | | | | | |
| | (A-7) | | | | | 90 | | | | | | |
| | (A-8) | | | | | | 90 | | | | | |
| | (A-9) | | | | | | | 90 | | | | |
| | (A-10) | | | | | | | | 90 | | | |
| | (A-11) | | | | | | | | | 90 | | |
| | (A-12) | | | | | | | | | | | |
| | (A-13) | | | | | | | | | | | |
| | (A-14) | | | | | | | | | | | |
| | (A-15) | | | | | | | | | | | |
| | (A-16) | | | | | | | | | | | |
| | (A-17) | | | | | | | | | | | |
| | (A-18) | | | | | | | | | | | |
| | (A-19) | | | | | | | | | | | |
| | (A-20) | | | | | | | | | | | |
| | (A-21) | | | | | | | | | | | |
| | (A-22) | | | | | | | | | | | |
| Component (B) | (B-1) | 3 | 3 | 3 | 3 | 3 | 3 | 3 | 3 | 3 | 3 | 3 |
| Component (C) | FA-512M | 10 | 10 | 10 | 10 | 10 | 10 | 10 | 10 | 10 | 10 | 10 |
| Mass ratio [A]/[C] | | 9 | 9 | 9 | 9 | 9 | 9 | 9 | 9 | 9 | 9 | 9 |
| [B] × 100/(total amount of composition) [% by mass] | | 2.9 | 2.9 | 2.9 | 2.9 | 2.9 | 2.9 | 2.9 | 2.9 | 2.9 | 2.9 | 2.9 |
| Adhesion to glass | | 5 | 3 | 2 | 3 | 4 | 3 | 5 | 4 | 2 | 2 | 5 |

| | | Example | | | | | | | | Comparative Example | | |
|---|---|---|---|---|---|---|---|---|---|---|---|---|
| | | 48 | 49 | 50 | 51 | 52 | 53 | 54 | 55 | 7 | 8 | 9 |
| Compounding (part(s) by mass) | Component (A) (A-1) | | | | | | | | | | | |
| | (A-2) | | | | | | | | | | | |
| | (A-3) | | | | | | | | | | | |
| | (A-4) | | | | | | | | | | | |
| | (A-5) | | | | | | | | | | | |
| | (A-6) | | | | | | | | | | | |
| | (A-7) | | | | | | | | | | | |
| | (A-8) | | | | | | | | | | | |
| | (A-9) | | | | | | | | | | | |
| | (A-10) | | | | | | | | | | | |
| | (A-11) | | | | | | | | | | | |
| | (A-12) | 90 | | | | | | | | | | |
| | (A-13) | | 90 | | | | | | | | | |
| | (A-14) | | | 90 | | | | | | | | |
| | (A-15) | | | | 90 | | | | | | | |
| | (A-16) | | | | | 90 | | | | | | |
| | (A-17) | | | | | | 90 | | | | | |
| | (A-18) | | | | | | | 90 | | | | |
| | (A-19) | | | | | | | | 90 | | | |
| | (A-20) | | | | | | | | | 90 | | |
| | (A-21) | | | | | | | | | | 90 | |
| | (A-22) | | | | | | | | | | | 90 |
| Component (B) (B-1) | | 3 | 3 | 3 | 3 | 3 | 3 | 3 | 3 | 3 | 3 | 3 |
| Component (C) FA-512M | | 10 | 10 | 10 | 10 | 10 | 10 | 10 | 10 | 10 | 10 | 50 |
| Mass ratio [A]/[C] | | 9 | 9 | 9 | 9 | 9 | 9 | 9 | 9 | 9 | 9 | 1.8 |
| [B] × 100/(total amount of composition) [% by mass] | | 2.9 | 2.9 | 2.9 | 2.9 | 2.9 | 2.9 | 2.9 | 2.9 | 2.9 | 2.9 | 2.1 |
| Adhesion to glass | | 2 | 5 | 5 | 5 | 5 | 5 | 5 | 5 | 1 | 2 | 4 |

From Table 4, it can be seen that the cured product obtained from the curable resin composition of Comparative Example 7 using the modified liquid polyisoprene (A-20) having no modified group (b) has extremely low adhesion to glass. On the other hand, it can be seen that the cured products obtained from the curable resin compositions of Examples 37 to 55 using the modified liquid polyisoprenes (A-1) to (A-19) having the modified group (a) and the modified group (b) in specific ranges are improved in adhesion to glass as compared with the cured product obtained in Comparative Example 7.

INDUSTRIAL APPLICABILITY

The modified liquid diene-based rubber obtained in the present invention has high compatibility with various monomers such as acrylate or methacrylate having relatively high polarity. Further, a curable resin composition containing the modified liquid diene-based rubber can be prepared with good workability, and the composition has a satisfactory curing rate when it is cured. Furthermore, a cured product obtained from the curable resin composition has excellent mechanical properties derived from the modified liquid diene-based rubber. In addition, the cured product has excellent adhesion to various materials. On that account, the curable resin composition is preferable for various applications such as optical applications and electric/electronic part applications, specifically as an adhesive, a pressure-sensitive adhesive, a coating agent, a sealing material, an ink or the like, and the composition is a useful material.

The invention claimed is:

1. A modified liquid diene-based rubber (A) comprising, in a molecule, a modified group (a) comprising a (meth) acryloyl group as a part thereof and at least one modified group (b) selected from a dicarboxylic acid monoester and a dicarboxylic acid monoamide, with the proviso that the modified group (b) comprises no (meth)acryloyl group as a part thereof,
   wherein the functional group equivalent weights of the modified group (a) and the modified group (b) are each in the range of 700 to 40,000 g/eq, and
   wherein the modified group (b) is at least one kind selected from the group consisting of a dicarboxylic acid monoester of formula (b1) or (b1') and a dicarboxylic acid monoamide of formula (b2) or (b2'):

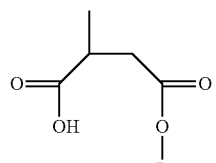
(b1)

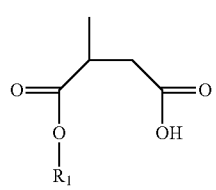
(b1')

wherein, in formulae (b1) and (b1'), $R_1$ is an optionally substituted alkyl group that comprises no (meth)acryloyl group as a part thereof,

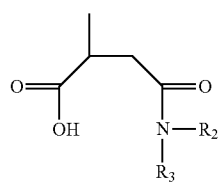
(b2)

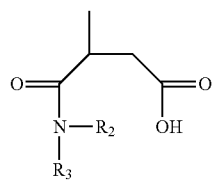
(b2')

wherein, in formulae (b2) and (b2'), $R_2$ and $R_3$ are each a hydrogen atom or an optionally substituted alkyl group that comprises no (meth)acryloyl group as a part thereof.

2. The modified liquid diene-based rubber (A) of claim 1, wherein the modified group (b) is a dicarboxylic acid monoester having an ester moiety of formula —COO—$C_nH_{2n+1}$ wherein n is an integer of $1 \leq n \leq 20$, or a dicarboxylic acid monoester having an ester moiety of formula —COO—$C_nH_{2n+1-m}X_m$ wherein n is an integer of $1 \leq n \leq 20$, m is a number of $1 \leq m \leq 2n+1$, and X is a substituent.

3. The modified liquid diene-based rubber (A) of claim 1, wherein the modified group (a) is a dicarboxylic acid monoester comprising a (meth)acryloyl group as a part thereof.

4. The modified liquid diene-based rubber (A) of claim 3, wherein the modified group (a) is a dicarboxylic acid monoester having an ester group derived from hydroxyalkyl (meth)acrylate or hydroxyalkyl(meth)acrylamide.

5. The modified liquid diene-based rubber (A) of claim 1, having a melt viscosity of 0.1 to 3,000 Pa·s at 38° C.

6. The modified liquid diene-based rubber (A) of claim 1, having a number-average molecular weight (Mn) of 2,000 to 500,000.

7. A production process for the modified liquid diene-based rubber (A) of claim 1, comprising:
   (1) allowing an unsaturated dicarboxylic anhydride to undergo addition to an unmodified liquid diene-based rubber to produce an unsaturated dicarboxylic anhydride modified liquid diene-based rubber, and
   (2) adding a modifying compound (a') comprising a (meth)acryloyl group as a part thereof and at least one modifying compound (b') selected from an alcohol and an amine and comprising no (meth)acryloyl group as a part thereof in a molar ratio ((a'):(b')) of 0.05:0.95 to 0.95:0.05 to the unsaturated dicarboxylic anhydride modified liquid diene-based rubber to react with one another.

8. A curable resin composition comprising a modified liquid diene-based rubber (A) comprising, in a molecule, a modified group (a) comprising a (meth)acryloyl group as a part thereof and at least one modified group (b) selected from a dicarboxylic acid monoester and a dicarboxylic acid monoamide (with the proviso that the modified group (b) comprises no (meth)acryloyl group as a part thereof), the functional group equivalent weights of the modified group (a) and the modified group (b) being each in the range of 700 to 40,000 g/eq, and a radical polymerization initiator (B),
   wherein the radical polymerization initiator (B) is contained in an amount of 0.1 to 20 parts by mass based on 100 parts by mass of the total amount of the resin composition, and
   wherein the modified group (b) is at least one kind selected from the group consisting of a dicarboxylic acid monoester of formula (b1) or (b1') and a dicarboxylic acid monoamide of formula (b2) or (b2'):

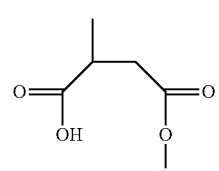
(b1)

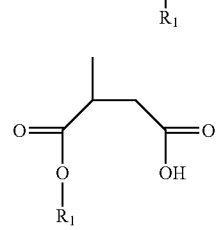
(b1')

wherein, in formulae (b1) and (b1'), $R_1$ is an optionally substituted alkyl group that comprises no (meth)acryloyl group as a part thereof,

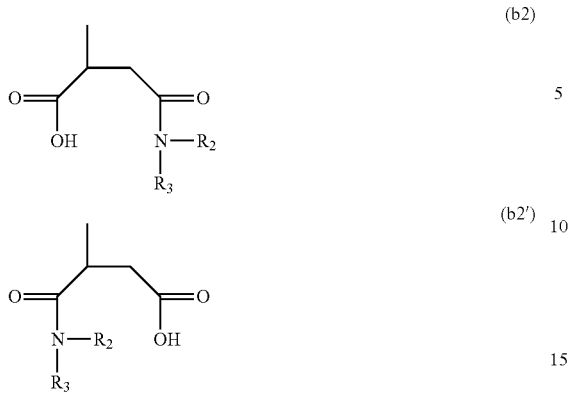

wherein, in formulae (b2) and (b2'), $R_2$ and $R_3$ are each a hydrogen atom or an optionally substituted alkyl group that comprises no (meth)acryloyl group as a part thereof.

9. The curable resin composition of claim 8, further comprising a radical-polymerizable monomer (C) having a carbon-carbon double bond, wherein the mass ratio [(A)/(C)] of the modified liquid diene-based rubber (A) to the monomer (C) is 0.01 to 100.

10. A cured product obtained from the curable resin composition of claim 8.

11. An optical adhesive comprising the curable resin composition of claim 8.

* * * * *